US012689443B2

(12) United States Patent
Yan et al.

(10) Patent No.: US 12,689,443 B2
(45) Date of Patent: Jul. 21, 2026

(54) ENCODING METHOD, DECODING METHOD, AND OPTICAL MODULE

(71) Applicant: HUAWEI TECHNOLOGIES CO., LTD., Shenzhen (CN)

(72) Inventors: Zengchao Yan, Shenzhen (CN); Wai Kong Raymond Leung, Shenzhen (CN); Huixiao Ma, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 258 days.

(21) Appl. No.: 18/534,259

(22) Filed: Dec. 8, 2023

(65) Prior Publication Data

US 2024/0106542 A1     Mar. 28, 2024

Related U.S. Application Data

(63) Continuation of application No. PCT/CN2022/093833, filed on May 19, 2022.

(51) Int. Cl.
*H04B 10/516* (2013.01)
*H04B 10/60* (2013.01)
*H04L 1/00* (2006.01)

(52) U.S. Cl.
CPC ........... *H04B 10/516* (2013.01); *H04B 10/60* (2013.01); *H04L 1/0025* (2013.01)

(58) Field of Classification Search
CPC ...... H04B 10/516; H04B 10/60; H04L 1/0025
See application file for complete search history.

(56) References Cited

U.S. PATENT DOCUMENTS

| | | | | |
|---|---|---|---|---|
| 2008/0260378 A1* | 10/2008 | Khermosh | ............ | H04L 1/0009 |
| | | | | 398/168 |
| 2017/0070314 A1* | 3/2017 | Effenberger | .......... | H04L 1/0045 |
| 2020/0021313 A1* | 1/2020 | Lu | ......................... | H04L 1/0065 |

FOREIGN PATENT DOCUMENTS

| | | | | |
|---|---|---|---|---|
| JP | 2018515955 A | 6/2018 | | |
| WO | WO-2019096151 A1 * | 5/2019 | ............ | H04Q 11/00 |

OTHER PUBLICATIONS

"IEEE Standard for Ethernet," IEEE Std 802.3, LAN/MAN Standards Committee of the IEEE Computer Society, Total 4017 pages (Sep. 2015).

(Continued)

*Primary Examiner* — Pranesh K Barua
(74) *Attorney, Agent, or Firm* — Leydig, Voit & Mayer, Ltd.

(57) ABSTRACT
An encoding method, a decoding method, and an optical module are described relating to data transmission technologies. The method, carried out by an optical module includes obtaining an optical transmission mode used for signal transmission. The method further includes receiving a signal on which outer-code encoding has been performed. The optical module determines, based on the optical transmission mode, an inner-code encoding scheme to be used by the optical module to perform inner-code encoding on the signal on which outer-code encoding has been performed. The method further includes performing, by using the inner-code encoding scheme, inner-code encoding on the signal on which outer-code encoding has been performed. The optical module outputs a signal on which inner-code encoding has been performed. As a result, error correction performance of the Ethernet may be improved.

20 Claims, 10 Drawing Sheets

(56)        References Cited

OTHER PUBLICATIONS

Schmalen et al., "Forward Error Correction in Optical Core and Optical Access Networks," Bell Labs Technical Journal 18 (3), 33-66, Alcatel-Lucent, total 28 pages, Institute of Electrical and Electronics Engineers, New York, New York (Dec. 1, 2013).
Tian et al., "800Gb/s-FR4 Specification and Interoperability Analysis," 2021 Optical Fiber Communications Conference and Exhibition (OFC), total 3 pages, Institute of Electrical and Electronics Engineers, New York, New York (Jun. 6, 2021).

* cited by examiner

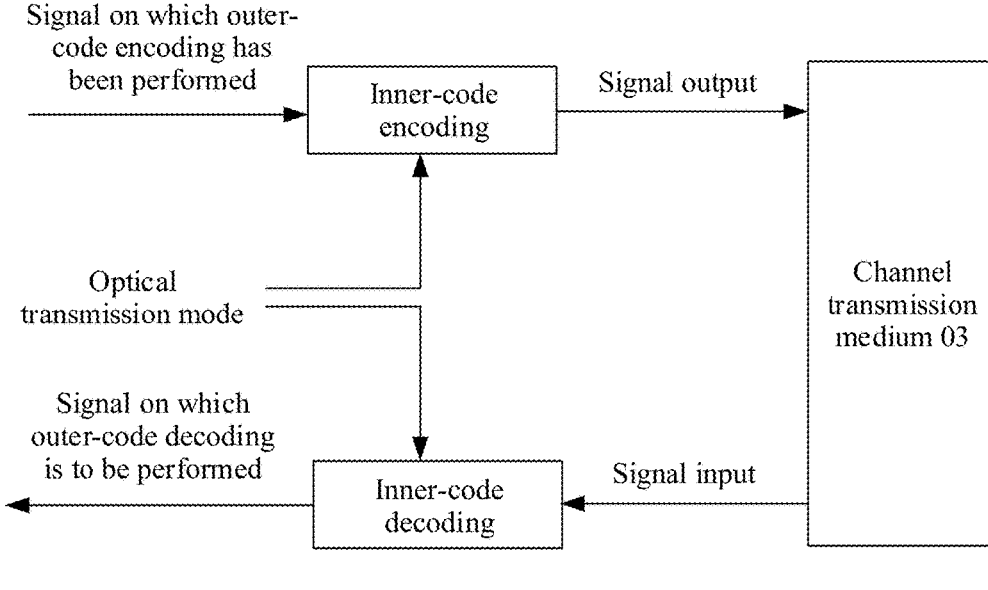

Signal on which outer-code encoding has been performed

Inner-code encoding

Signal output

Channel transmission medium 03

Optical transmission mode

Signal on which outer-code decoding is to be performed

Inner-code decoding

Signal input

FIG. 6

| 701 |
| An optical module receives a signal on which outer-code encoding has been performed |

| 702 |
| A transmitting-end optical module obtains an optical transmission mode used by the transmitting-end optical module for signal transmission |

| 703 |
| The transmitting-end optical module determines, based on the optical transmission mode, an inner-code encoding scheme to be used by the transmitting-end optical module to perform inner-code encoding on the signal on which outer-code encoding has been performed |

| 704 |
| The transmitting-end optical module performs, by using the inner-code encoding scheme, inner-code encoding on the signal on which outer-code encoding has been performed, and outputs a signal on which inner-code encoding has been performed |

FIG. 7

| LSB | | | | | | | | | | | | | | | MSB |
| D0 | D1 | D2 | D3 | D4 | D5 | D6 | D7 | D8 | D9 | D10 | D11 | D12 | D13 | D14 | D15 |
| rsvd | rsvd | rsvd | rsvd | rsvd | FD | HD | PS1 | PS2 | rsvd | rsvd | rsvd | RF1 | RF2 | Ack | NP |

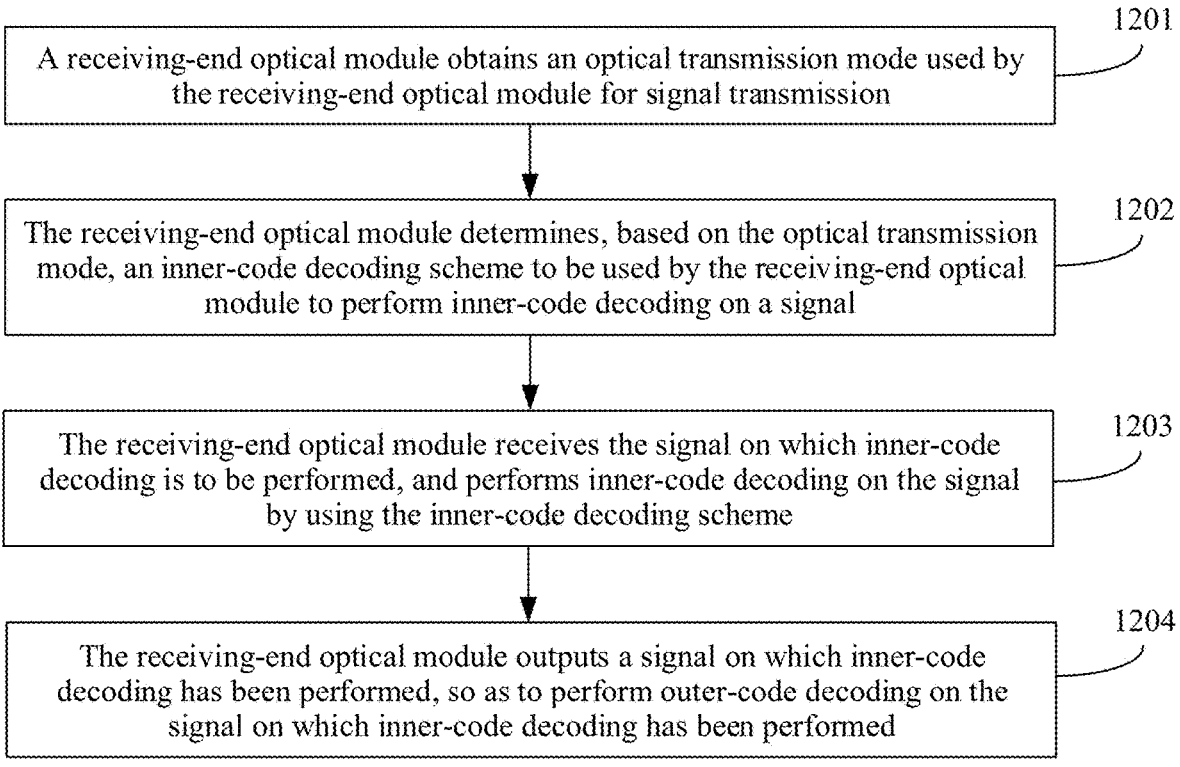

A receiving-end optical module obtains an optical transmission mode used by the receiving-end optical module for signal transmission　1201

The receiving-end optical module determines, based on the optical transmission mode, an inner-code decoding scheme to be used by the receiving-end optical module to perform inner-code decoding on a signal　1202

The receiving-end optical module receives the signal on which inner-code decoding is to be performed, and performs inner-code decoding on the signal by using the inner-code decoding scheme　1203

The receiving-end optical module outputs a signal on which inner-code decoding has been performed, so as to perform outer-code decoding on the signal on which inner-code decoding has been performed　1204

FIG. 12

Optical module 130

Input unit 1301

Encoding unit 1302

Output unit 1303

FIG. 13

Optical module 140

ENCODING METHOD, DECODING METHOD, AND OPTICAL MODULE

CROSS-REFERENCE TO RELATED APPLICATIONS

This application is a continuation of International Application No. PCT/CN2022/093833, filed on May 19, 2022, which claims priority to Chinese Patent Application No. 202110655657.1, filed on Jun. 11, 2021. The disclosures of the aforementioned applications are hereby incorporated by reference in their entireties.

TECHNICAL FIELD

Embodiments of this application relate to the field of data transmission technologies, and in particular, to an encoding method, a decoding method, and an optical module.

BACKGROUND

With the wide application of 5G, artificial intelligence, and virtual reality, traffic of a data center is growing constantly and rapidly. The existing 400GE (400 gigabits per second (400 Gbps) Ethernet) technology cannot meet a requirement for an underlying interconnection architecture of a future data center. Therefore, a next-generation Ethernet technology with higher bandwidth is required to meet a bandwidth requirement of the future data center. However, as a transmission rate of the Ethernet increases, a transmission bit error rate of the Ethernet increases accordingly, and using a forward error correction (FEC) scheme to correct a transmitted signal will become a core technology for eliminating a transmission bit error.

There are many devices in a data center. In a related technology, in a process in which a transmitting device in a data center transmits a signal to a receiving device, the signal needs to be encoded on the transmitting device, for example, the signal is encoded by using Reed-Solomon codes (also referred to as RS codes for short); and the signal needs to be decoded on the receiving device, for example, the signal is decoded by using the RS codes, to implement forward error correction on the signal by using the encoding and decoding processes.

However, the forward error correction scheme cannot meet a requirement for error correction performance of a next-generation Ethernet.

SUMMARY

Embodiment of this application provide an encoding method, a decoding method, and an optical module, to improve error correction performance of the Ethernet.

According to a first aspect, this application provides an encoding method. The method includes: an optical module obtains an optical transmission mode used for signal transmission; the optical module receives a signal on which outer-code encoding has been performed; the optical module determines, based on the optical transmission mode, an inner-code encoding scheme to be used by the optical module to perform inner-code encoding on the signal on which outer-code encoding has been performed; the optical module performs, by using the inner-code encoding scheme, inner-code encoding on the signal on which outer-code encoding has been performed; and the optical module outputs a signal on which inner-code encoding has been performed.

According to the encoding method provided in this application, the inner-code encoding scheme can be determined based on the optical transmission mode used by the optical module for signal transmission, so that an appropriate encoding scheme can be selected based on different transmission scenarios, and signal transmission performance in different transmission scenarios can be ensured, for example, transmission performance such as error correction performance, a delay requirement, and an energy consumption requirement in a transmission process can be met.

There are a plurality of implementations in which the optical module obtains the optical transmission mode used by the optical module for signal transmission. In this application, the following three implementations are used as an example for description.

In a first implementation, that an optical module obtains an optical transmission mode used by the optical module for signal transmission includes: the optical module receives indication information from a transmitting device, and determines the optical transmission mode based on the indication information. The transmitting device is configured to determine the optical transmission mode through Ethernet automatic negotiation with a receiving device.

In the first implementation, the indication information sent by the transmitting device is received, and the optical transmission mode is determined based on the indication information. Therefore, the optical transmission mode can be determined in a relatively simple manner with no additional calculation or storage cost. In addition, when determining the optical transmission mode through auto-negotiation, the transmitting device can use reserved bits in encoding information with no additional operation cost, which simplifies a manner of determining the optical transmission mode.

In a second implementation, that the optical module obtains an optical transmission mode used by the optical module for signal transmission includes: the optical module receives indication information from a transmitting device, and determines the optical transmission mode based on the indication information. The transmitting device is configured to determine the optical transmission mode. For example, the transmitting device may receive a control stream sent by a network controller, where the control stream is used to indicate the transmitting device to send the optical transmission mode used by the transmitting device, and a media access control layer of the transmitting device can determine, according to the control stream, the optical transmission mode used for signal transmission.

In the second implementation, the transmitting device determines the optical transmission mode, and the transmitting device sends, to a transmitting-end optical module, the indication information indicating the optical transmission mode, so that the optical transmission mode can be determined in a relatively simple manner with no additional calculation or storage cost. In addition, a default field in the encoding information encoded by using the first PCS is used to indicate the optical transmission mode, and reserved bits in the encoding information are used with no additional operation cost, which simplifies a manner of determining the optical transmission mode.

Optionally, in the first implementation and the second implementation, that the optical module determines the optical transmission mode based on the indication information includes: the optical module extracts, from the indication information, a parameter used to indicate the optical transmission mode, and determines the optical transmission mode based on the parameter used to indicate the optical transmission mode, where the indication information carries one or more parameters.

In a third implementation, that the optical module obtains an optical transmission mode used by the optical module for signal transmission includes: the optical module determines the optical transmission mode based on a configuration operation performed by the control device on the optical module. The control device may be a device such as a host computer that is used by an administrator to manage an optical module.

Optionally, the optical module includes a memory, and the configuration operation includes: a write operation performed on an identifier that is in the memory and that indicates the optical transmission mode. Correspondingly, the optical module may determine the optical transmission mode by reading the identifier that is in the memory and that indicates the optical transmission mode.

In the third implementation, the optical transmission mode is configured through software configuration, and no additional overhead is required, so that the implementation is simple, and a transmission cost of the data center network is reduced.

In this application, for different encoding schemes corresponding to a point-to-point optical transmission mode and a point-to-multipoint optical transmission mode, encoding in the different encoding schemes may be implemented via a same optical module. In a possible implementation, the optical module includes a selection subassembly and a component code encoder, and that the optical module performs, by using the inner-code encoding scheme, inner-code encoding on the signal on which outer-code encoding has been performed includes: the selection subassembly selects a target candidate signal from a plurality of candidate signals according to the inner-code encoding scheme, and provides the target candidate signal to the component code encoder; and the component code encoder performs, based on the target candidate signal, inner-code encoding on the signal on which outer-code encoding has been performed.

It can be learned that, in the optical module provided in this embodiment of this application, impact of different encoding schemes on an encoding process is represented as impact on the target candidate signal that is used by the component code encoder to perform inner-code encoding. In addition, the selection subassembly is disposed in the optical module, and the selection subassembly can select candidate signals according to an encoding scheme, and can switch between different encoding schemes in the same optical module, so that the optical module can encode signals according to different encoding schemes. Compared with the implementation of switching between different optical modules to use different encoding schemes for encoding, this effectively improves efficiency of encoding signals by using different encoding schemes, improves compatibility of the optical module, and increases area and power consumption advantages of the optical modules.

Optionally, the optical transmission mode includes a point-to-point optical transmission mode or a point-to-multipoint optical transmission mode; in the point-to-point optical transmission mode, the signal is transmitted from the transmitting device to the receiving device by using a single channel; and in the point-to-multipoint optical transmission mode, the signal is transmitted from the transmitting device to the receiving device in a single channel-to-multichannel manner.

In a possible implementation, a correspondence between an optical transmission mode and an encoding scheme is built in the optical module, and the optical module determines, based on the optical transmission mode, an inner-code encoding scheme to be used by the optical module to perform inner-code encoding on the signal on which outer-code encoding has been performed includes: the optical module queries, based on the optical transmission mode, the correspondence between an optical transmission mode and an encoding scheme, to obtain the inner-code encoding scheme.

In addition, the correspondence between an optical transmission mode and an encoding scheme includes: the point-to-point optical transmission mode corresponds to a spatially coupled encoding scheme, and the point-to-multipoint optical transmission mode corresponds to a block algebraic encoding scheme.

The spatially coupled encoding scheme includes: encoding by using a zipper code; and the block algebraic encoding scheme includes: encoding by using a Hamming code or a BCH code.

In the point-to-point optical transmission mode, a spatially coupled encoding scheme (e.g., a zipper code) is selected, so that inner-code encoding that features high speed, high performance, low power consumption and meets a requirement for a delay indicator can be implemented. In the point-to-multipoint optical transmission mode, a block algebraic encoding scheme (e.g., a Hamming code or a BCH code) is selected, so that flexible and configurable inner-code encoding with an ultra-low delay can be implemented, so as to ensure a delay requirement in the point-to-multipoint optical transmission mode.

According to a second aspect, this application provides an inner-code decoding method. The method includes: an optical module obtains an optical transmission mode used by the optical module for signal transmission; the optical module receives a signal on which inner-code decoding is to be performed; the optical module determines, based on the optical transmission mode, an inner-code decoding scheme to be used by the optical module to perform inner-code decoding on the signal; the optical module performs inner-code decoding on the signal by using the inner-code decoding scheme; and the optical module outputs a signal on which inner-code decoding has been performed, so as to perform outer-code decoding on the signal on which inner-code decoding has been performed.

There are a plurality of implementations in which the optical module obtains the optical transmission mode used by the optical module for signal transmission. In this application, the following three implementations are used as an example for description.

In a first implementation, that an optical module obtains an optical transmission mode used by the optical module for signal transmission includes: the optical module receives indication information from a receiving device, and determines the optical transmission mode based on the indication information, where the indication information of the receiving device may be obtained through Ethernet auto-negotiation between the receiving device and a transmitting device, or the indication information of the receiving device is obtained from a network controller.

Optionally, that the optical module determines the optical transmission mode based on the indication information includes: the optical module extracts, from the indication information, a parameter used to indicate the optical transmission mode, and determines the optical transmission mode based on the parameter used to indicate the optical transmission mode, where the indication information carries one or more parameters.

In a second implementation, that the optical module obtains an optical transmission mode used by the optical module for signal transmission includes: the optical module determines the optical transmission mode based on a configuration operation performed by the control device on the optical module.

Optionally, the optical module includes a memory, and the configuration operation includes: a write operation performed on an identifier that is in the memory and that indicates the optical transmission mode. Correspondingly, the optical module may determine the optical transmission mode by reading the identifier that is in the memory and that indicates the optical transmission mode.

In this application, for different decoding schemes corresponding to a point-to-point optical transmission mode and a point-to-multipoint optical transmission mode, decoding in the different decoding schemes may be implemented via a same optical module. In a possible implementation, the optical module includes a selection subassembly and a component code decoder, and that the optical module performs inner-code decoding on the signal by using the inner-code decoding scheme includes: the selection subassembly selects a target candidate signal from a plurality of candidate signals according to the inner-code decoding scheme, and provides the target candidate signal to the component code decoder; and the component code decoder performs, based on the target candidate signal, inner-code decoding on the signal.

It can be learned that, in the optical module provided in this embodiment of this application, impact of different decoding schemes on a decoding process is represented as impact on the target candidate signal used by the component code decoder to perform inner-code decoding. In addition, the selection subassembly is disposed in the optical module, and the selection subassembly can select candidate signals according to a decoding scheme, and can switch between different decoding schemes in the same optical module, so that the optical module can decode signals according to different decoding schemes. Compared with the implementation of switching between different optical modules to use different decoding schemes for decoding, this effectively improves efficiency of decoding signals by using different decoding schemes, improves compatibility of the optical module, and increases area and power consumption advantages of the optical modules.

In a possible implementation, a correspondence between an optical transmission mode and a decoding scheme is built in the optical module, and the optical module determines, based on the optical transmission mode, an inner-code decoding scheme to be used by the optical module to perform inner-code decoding on the signal includes: the optical module queries, based on the optical transmission mode, the correspondence between the optical transmission mode and the decoding scheme, to obtain the inner-code decoding scheme.

Optionally, the optical transmission mode includes a point-to-point optical transmission mode or a point-to-multipoint optical transmission mode; in the point-to-point optical transmission mode, the signal is transmitted from the transmitting device to the receiving device by using a single channel; and in the point-to-multipoint optical transmission mode, the signal is transmitted from the transmitting device to the receiving device in a single channel-to-multichannel manner. A correspondence between the optical transmission mode and the decoding scheme includes: the point-to-point optical transmission mode corresponds to a spatially coupled decoding scheme, and the point-to-multipoint optical transmission mode corresponds to a block algebraic decoding scheme.

The spatially coupled decoding scheme includes: decoding by using a zipper code; and the block algebraic decoding scheme includes: decoding by using a Hamming code or a BCH code.

In the point-to-point optical transmission mode, a spatially coupled decoding scheme (e.g., a zipper code) is selected, so that inner-code decoding that features high speed, high performance, low power consumption and meets a requirement for a delay indicator can be implemented. In the point-to-multipoint optical transmission mode, a block algebraic decoding scheme (e.g., a Hamming code or a BCH code) is selected, so that flexible and configurable inner-code decoding with an ultra-low delay can be implemented, so as to ensure a delay requirement in the point-to-multipoint optical transmission mode.

According to a third aspect, this application provides an optical module, where the optical module includes: an encoding unit, configured to obtain an optical transmission mode used by the optical module for signal transmission; an input unit, configured to receive a signal on which outer-code encoding has been performed, where the encoding unit is further configured to determine, based on the optical transmission mode, an inner-code encoding scheme for performing inner-code encoding on the signal on which outer-code encoding has been performed, and the encoding unit is further configured to perform, by using the inner-code encoding scheme, inner-code encoding on the signal on which outer-code encoding has been performed; and an output unit, configured to output a signal on which inner-code encoding has been performed.

Optionally, the encoding unit is specifically configured to: receive indication information from a transmitting device, and determine the optical transmission mode based on the indication information.

Optionally, the indication information of the transmitting device is obtained through Ethernet auto-negotiation between the transmitting device and the receiving device, or the indication information of the transmitting device is obtained from a network controller.

Optionally, that the encoding unit determines the optical transmission mode based on the indication information includes: extracting, from the indication information, a parameter used to indicate the optical transmission mode, and determining the optical transmission mode based on the parameter used to indicate the optical transmission mode, where the indication information carries one or more parameters.

Optionally, the optical module includes a memory, and the encoding unit is specifically configured to determine the optical transmission mode based on a write operation performed by a control device on an identifier that is in the memory and that indicates the optical transmission mode.

Optionally, the encoding unit includes a selection subassembly and a component code encoder, where the selection subassembly selects a target candidate signal from a plurality of candidate signals according to an inner-code encoding scheme, and provides the target candidate signal to the component code encoder; and the component code encoder performs, based on the target candidate signal, inner-code encoding on the signal on which outer-code encoding has been performed.

Optionally, the optical transmission mode includes a point-to-point optical transmission mode or a point-to-multipoint optical transmission mode; in the point-to-point optical transmission mode, the signal is transmitted from the transmitting device to the receiving device by using a single channel; and in the point-to-multipoint optical transmission mode, the signal is transmitted from the transmitting device to the receiving device in a single channel-to-multichannel manner.

Optionally, the encoding unit is specifically configured to query a correspondence between an optical transmission mode and an encoding scheme based on the optical transmission mode, to obtain the inner-code encoding scheme. The correspondence between an optical transmission mode and an encoding scheme includes: the point-to-point optical transmission mode corresponds to a spatially coupled encoding scheme, and the point-to-multipoint optical transmission mode corresponds to a block algebraic encoding scheme.

Optionally, the spatially coupled encoding scheme includes: encoding by using a zipper code; and the block algebraic encoding scheme includes: encoding by using a Hamming code or a BCH code.

According to a fourth aspect, this application provides an optical module, where the optical module includes: a decoding unit, configured to obtain an optical transmission mode used by the optical module for signal transmission; an input unit, configured to receive a signal on which inner-code decoding is to be performed, where the decoding unit is further configured to determine, based on the optical transmission mode, an inner-code decoding scheme for performing inner-code decoding on the signal, and the decoding unit is further configured to perform inner-code decoding on the signal by using the inner-code decoding scheme; and an output unit, configured to output a signal on which inner-code decoding has been performed, so as to perform outer-code decoding on the signal on which inner-code decoding has been performed.

Optionally, the decoding unit is specifically configured to: receive indication information from the receiving device, and determine the optical transmission mode based on the indication information.

Optionally, the indication information of the receiving device is obtained through Ethernet auto-negotiation the receiving device and the transmitting device, or the indication information of the receiving device is obtained from a network controller.

Optionally, the decoding unit is specifically configured to: extract, from the indication information, a parameter used to indicate the optical transmission mode, and determine the optical transmission mode based on the parameter used to indicate the optical transmission mode, where the indication information carries one or more parameters.

Optionally, the optical module includes a memory, and the decoding unit is specifically configured to determine the optical transmission mode based on a write operation performed by a control device on an identifier that is in the memory and that indicates the optical transmission mode.

Optionally, the decoding unit includes a selection subassembly and a component code decoder, where the selection subassembly is configured to: select a target candidate signal from a plurality of candidate signals according to the inner-code decoding scheme, and provide the target candidate signal for the component code decoder; and the component code decoder is configured to perform inner-code decoding on the signal based on the target candidate signal.

Optionally, the decoding unit is specifically configured to query a correspondence between an optical transmission mode and a decoding scheme based on the optical transmission mode, to obtain the inner-code decoding scheme.

Optionally, the optical transmission mode includes a point-to-point optical transmission mode or a point-to-multipoint optical transmission mode; in the point-to-point optical transmission mode, the signal is transmitted from the transmitting device to the receiving device by using a single channel; and in the point-to-multipoint optical transmission mode, the signal is transmitted from the transmitting device to the receiving device in a single channel-to-multichannel manner.

Optionally, the correspondence between the optical transmission mode and the decoding scheme includes: the point-to-point optical transmission mode corresponds to a spatially coupled decoding scheme, and the point-to-multipoint optical transmission mode corresponds to a block algebraic decoding scheme.

Optionally, the spatially coupled decoding scheme includes: decoding by using a zipper code; and the block algebraic decoding scheme includes: decoding by using a Hamming code or a BCH code.

According to a fifth aspect, this application provides a computer device, including a memory and a processor. The memory stores program instructions, and the processor runs the program instructions to perform the method according to any one of the first aspect or the second aspect, or the possible implementations of the first aspect or the second aspect of this application.

According to a sixth aspect, this application provides a computer-readable storage medium, including program instructions. When the program instructions are run on a computer device, the computer device is enabled to perform the method according to any one of the first aspect or the second aspect, or the possible implementations of the first aspect or the second aspect of this application.

According to a seventh aspect, this application provides a computer program product. When the computer program product runs on a computer, the computer is enabled to perform the method according to any one of the first aspect or the second aspect, or the possible implementations of the first aspect or the second aspect of this application.

BRIEF DESCRIPTION OF DRAWINGS

FIG. 6 is a schematic diagram of a signal transmission process in an implementation environment according to an embodiment of this application;

FIG. 7 is a flowchart of a first encoding method according to an embodiment of this application;

FIG. 12 is a flowchart of a decoding method according to an embodiment of this application;

FIG. 13 is a schematic diagram of a framework of an optical module according to an embodiment of this application;

DESCRIPTION OF EMBODIMENTS

To make the objectives, technical solutions, and advantages of this application clearer, the following further describes the implementations of this application in detail with reference to the accompanying drawings.

As a transmission rate of the Ethernet increases, a transmission bit error rate of the Ethernet increases accordingly, and using an FEC scheme to correct a transmitted signal will become a core technology for eliminating a transmission bit error. Therefore, designing an efficient, low-complexity, and low-delay FEC encoding algorithm and implementation architecture becomes a major technical challenge for next-generation Ethernet technologies. Ethernet transmission scenarios include a data center (e.g., short-distance transmission in the data center), cloud storage, cloud computing, and backbone network transmission of a 5G base station, and other scenarios. In embodiments of this application, an example of signal transmission in a data center is used for description.

There are many devices in the data center, such as a switch and a router. In a process in which a transmitting device in the data center transmits a signal to a receiving device, a signal sent by the transmitting device is transmitted to the receiving device sequentially through a transmitting-end optical module, an optical fiber, a receiving-end optical module, and the like. In a related technology, a signal is usually encoded on a transmitting device, for example, an RS code is used to encode the signal, and decoding is performed on a receiving device, for example, an RS code is used to decode the signal, so as to implement forward error correction on the signal by using the encoding and decoding processes.

However, in a next-generation Ethernet technology, a plurality of optical transmission modes may be configured for a data center network according to an application requirement, and different optical transmission modes correspond to different single-channel transmission rates. Optionally, a plurality of optical transmission modes in the data center network include a point-to-point optical transmission mode and a point-to-multipoint optical transmission mode (also referred to as a breakout optical transmission mode). The point-to-point optical transmission mode is an optical transmission mode in which a signal is transmitted from a transmitting device to a receiving device through a single channel. The point-to-multipoint optical transmission mode is an optical transmission mode in which a signal is transmitted from a transmitting device to a receiving device in a single channel-to-multichannel manner.

Figure 1:
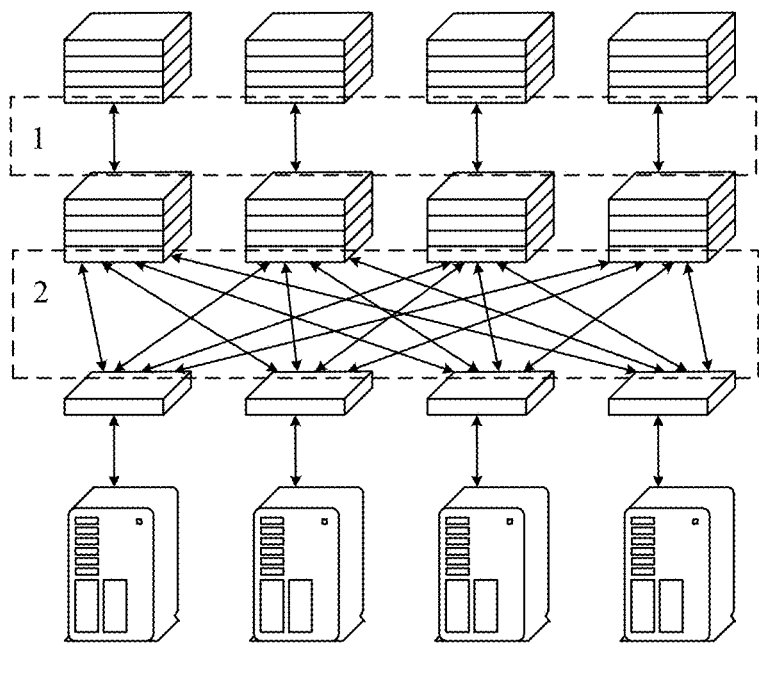
FIG. 1 is a schematic diagram of a structure of a data center network according to an embodiment of this application.

For example, as shown in FIG. 1, for a data center network using the 800 Gbps Ethernet, the data center network has a relatively high requirement for a throughput rate. In the data center network, an 800 Gbps point-to-point optical transmission mode and an 800 Gbps point-to-multipoint optical transmission mode are used. The 800 Gbps point-to-point optical transmission mode is shown in a dashed-line box 1 in FIG. 1. A single channel is used for signal transmission between two switches in the data center network, and a data stream throughput rate of the signal transmission is 800 Gbps. The 800 Gbps point-to-multipoint optical transmission mode is shown in a dashed-line box 2 in FIG. 1. A switch in a data center may separately transmit a signal to four switches by using a single channel, that is, transmit a signal by using four completely independent channels. A data stream throughput rate of a signal transmitted on each channel is 200 Gbps. That is, a switch acting as a transmitting device transmits a signal to the four switches by using the 800 Gbps point-to-multipoint optical transmission mode. In FIG. 1, a double-headed arrow represents one channel.

Figure 2:
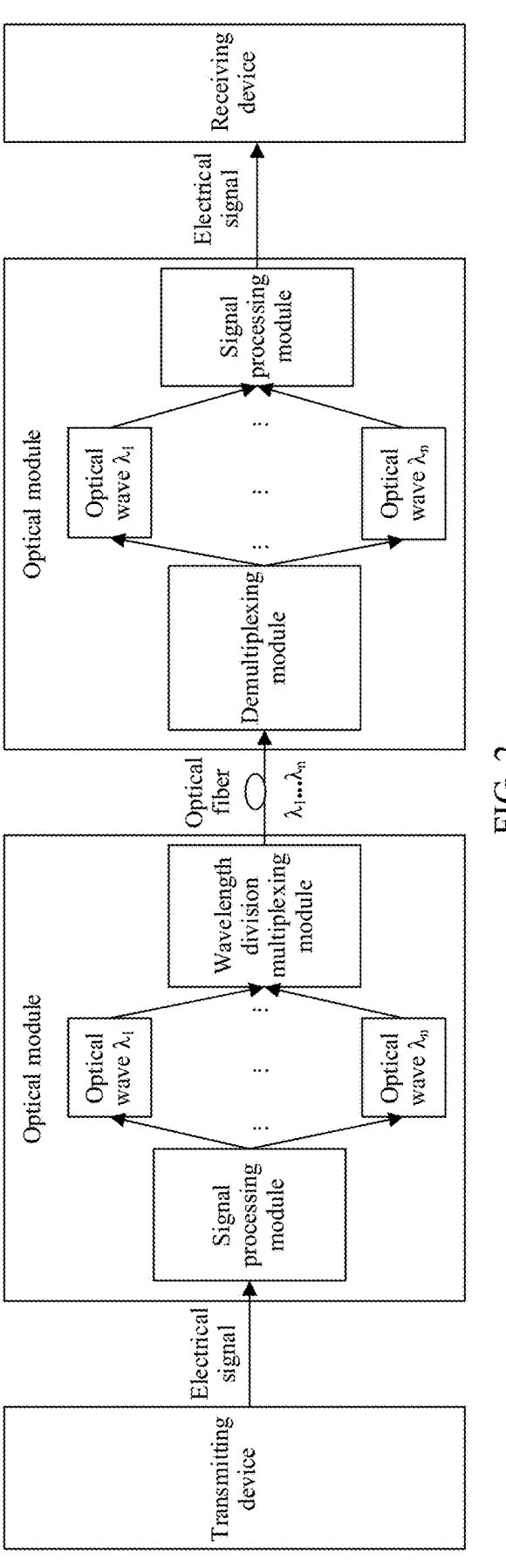
FIG. 2 is a schematic diagram of a process of a point-to-point optical transmission mode according to an embodiment of this application.

FIG. 2 is a schematic diagram of a process of a point-to-point optical transmission mode according to an embodiment of this application. As shown in FIG. 2, a transmitting device may send an electrical signal to an optical module located on a transmit side. The optical module includes a signal processing module and a wavelength division multiplexing module. The signal processing module converts the electrical signal into n (e.g., n=4) optical waves $\lambda 1, \ldots, \lambda n$. The wavelength division multiplexing module performs wavelength division multiplexing on the n optical waves to obtain one channel of optical signals, and then sends the channel of optical signals by using a single optical fiber. An optical module located on a receive side includes a demultiplexing module and a signal processing module. After receiving an optical signal from an optical fiber, the demultiplexing module performs a demultiplexing operation on the optical signal, to restore the optical signal to n optical waves $\lambda 1, \ldots, \lambda n$. The signal processing module converts the n optical waves $\lambda 1, \ldots, \lambda n$ into an electrical signal, and then sends the electrical signal to a receiving device.

Figure 3:
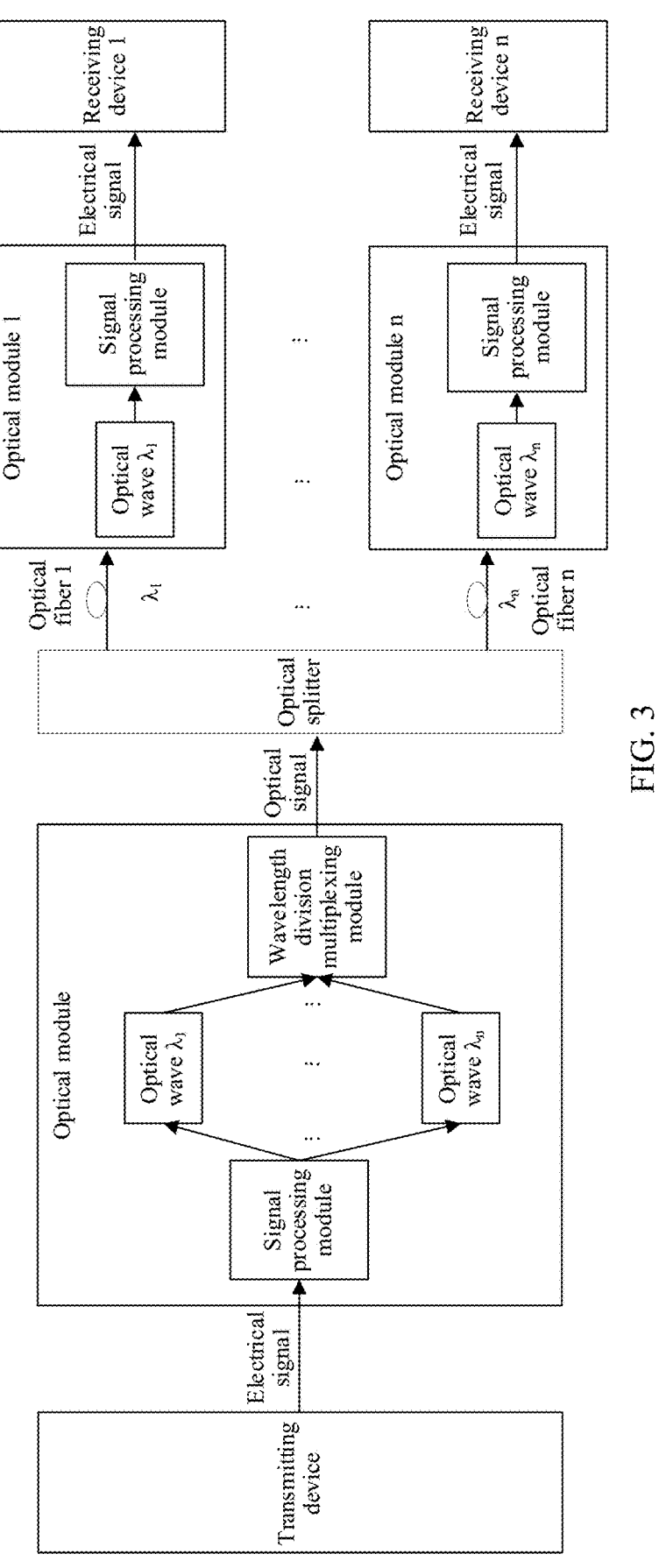
FIG. 3 is a schematic diagram of a process of a point-to-multipoint optical transmission mode according to an embodiment of this application.

FIG. 3 is a schematic diagram of a process of a point-to-multipoint optical transmission mode according to an embodiment of this application. As shown in FIG. 3, a transmitting device may send an electrical signal to an optical module located on a transmit side. The optical module includes a signal processing module and a wavelength division multiplexing module. The signal processing module converts the electrical signal into n (e.g., n=4) optical waves $\lambda 1, \ldots, \lambda n$. The wavelength division multiplexing module multiplexes the n optical waves into one channel of optical signals, and transmits the channel of signals to an optical splitter. The optical splitter splits the optical signal into n optical waves $\lambda 1, \ldots, \lambda n$. Then, the n optical waves $\lambda 1, \ldots,$ and $\lambda n$ are separately transmitted to the n optical modules by using the n optical fibers. After receiving the optical wave, each optical module converts the received optical wave into an electrical signal via the signal processing module, and then sends the electrical signal to a corresponding receiving device.

It should be noted that, in both the point-to-multipoint optical transmission mode shown in the dashed-line box 2 in FIG. 1 and the point-to-multipoint optical transmission mode shown in FIG. 3, a same transmitting device transmits a signal to a plurality of receiving devices. However, in the point-to-multipoint optical transmission mode, a same transmitting device may alternatively transmit a signal to a same receiving device in a single channel-to-multichannel manner. Details are not described herein.

Different optical transmission modes have different requirements for signal transmission performance, and a forward error correction scheme in a related technology cannot meet requirements for transmission performance such as error correction, a delay, and transmission power consumption of a next-generation Ethernet. For example, when zipper codes are used for encoding and decoding in the 800 Gbps point-to-point optical transmission mode and the 800 Gbps point-to-multipoint optical transmission mode, a delay limit of an Ethernet link will be exceeded in the point-to-multipoint optical transmission mode.

Embodiments of this application provide an encoding method and a decoding method. In the encoding method, the optical module can determine, according to an optical transmission mode used by the optical module for signal transmission, an inner-code encoding scheme to be used by the optical module to perform inner-code encoding on the signal on which outer-code encoding has been performed, and then perform, by using the inner-code encoding scheme, inner-code encoding on the signal on which outer-code encoding has been performed. In the decoding method, the optical module can determine, according to an optical transmission mode used by the optical module for signal transmission, an inner-code decoding scheme to be used by the optical module to perform inner-code decoding on the signal, perform inner-code decoding on the signal by using the inner-code decoding scheme, and then output a signal on which inner-code decoding has been performed, so as to perform outer-code decoding on the signal on which inner-code decoding has been performed.

According to the encoding method provided in this embodiment of this application, the inner-code encoding scheme can be determined based on the optical transmission mode used by the optical module for signal transmission, so that an appropriate encoding scheme can be selected based on different transmission scenarios, and signal transmission performance in different transmission scenarios can be ensured.

Similarly, according to the decoding method provided in this embodiment of this application, the inner-code decoding scheme can be determined based on the optical transmission mode used by the optical module for signal transmission, so that the inner-code decoding scheme to be used to decode the signal can adapt to the optical transmission mode, and signal transmission performance in different transmission scenarios can be ensured.

Figure 4:
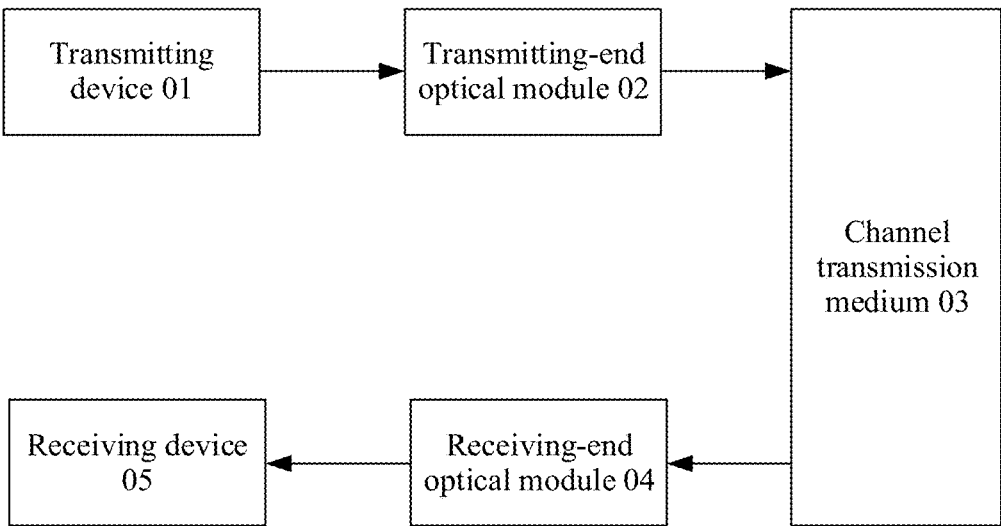
FIG. 4 is a schematic diagram of an implementation environment for an encoding method and a decoding method according to an embodiment of this application.

FIG. 4 is a schematic diagram of an implementation environment for an encoding method and a decoding method according to an embodiment of this application. As shown in FIG. 2, the implementation environment includes a transmitting device 01, a transmitting-end optical module (that is, an optical module located at a transmitting end) 02, a channel transmission medium 03, a receiving-end optical module (that is, an optical module located at a receiving end) 04, and a receiving device 05. In a data center network, the transmitting device 01 and the receiving device 05 may be devices such as switches or routers, and the channel transmission medium 03 may be an optical fiber.

Figure 5:
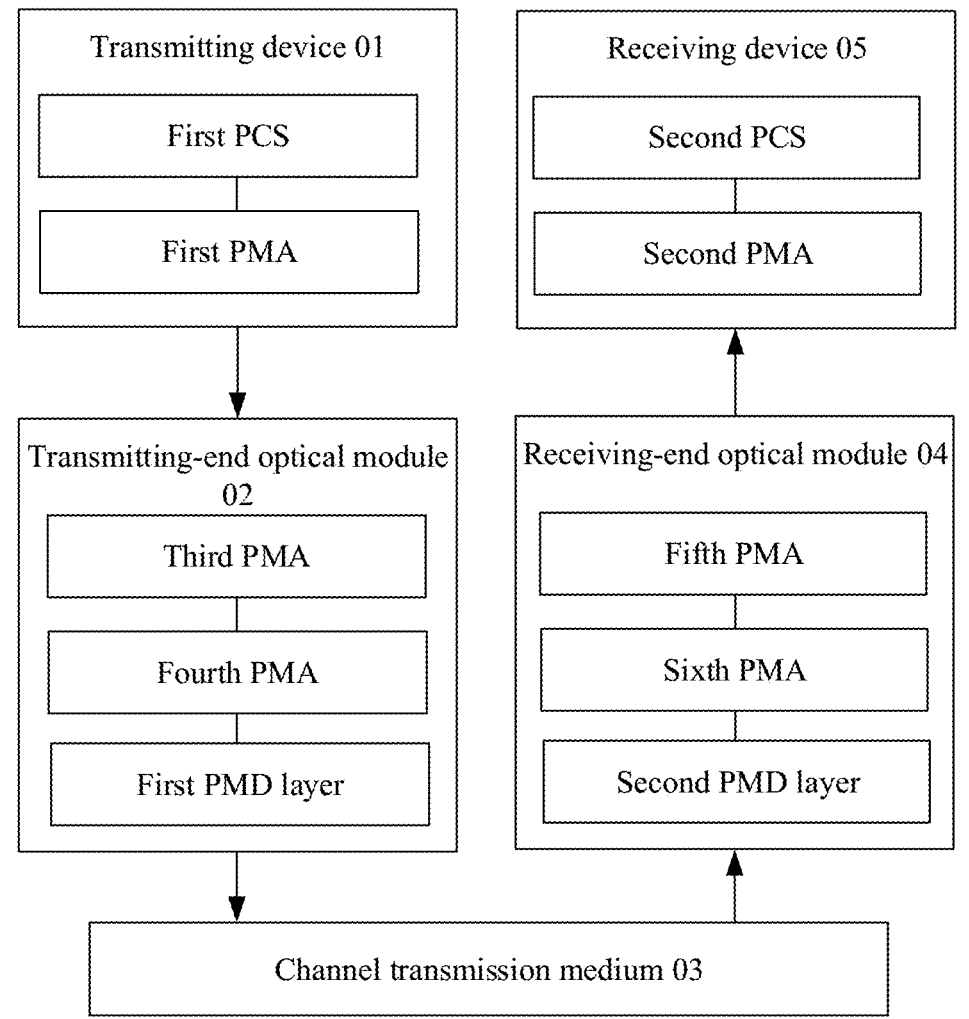
FIG. 5 is a schematic diagram of structures of a transmitting device, a transmitting-end optical module, a receiving-end optical module, and a receiving device according to an embodiment of this application.

Functional layers are disposed in the transmitting device 01, the transmitting-end optical module 02, the receiving-end optical module 04, and the receiving device 05. Functions of the transmitting device 01, the transmitting-end optical module 02, the receiving-end optical module 04, and the receiving device 05 mentioned in this embodiment of this application may be implemented via functional layers disposed in the transmitting device 01, the transmitting-end optical module 02, the receiving-end optical module 04, and the receiving device 05. For example, as shown in FIG. 5, a first physical coding sublayer (PCS) and a first physical medium attachment sublayer (PMA) are disposed in the transmitting device 01. A second PCS and a second PMA are disposed in the receiving device 05. A third PMA, a fourth PMA, and a first physical media dependent (PMD) layer are disposed in the transmitting-end optical module 02. A fifth PMA, a sixth PMA, and a second PMD layer are disposed in the receiving-end optical module 04. The transmitting device 01 may implement a function of encoding a signal via the first PCS. The receiving device 05 may implement a function of decoding a signal via the second PCS. The transmitting-end optical module 02 may implement a function of encoding a signal via the third PMA. The receiving-end optical module 04 may implement a function of decoding a signal via the fifth PMA.

FIG. 6 is a schematic diagram of a signal transmission process in the implementation environment shown in FIG. 4. As shown in FIG. 6, in a process of transmitting a signal from the transmitting device 01 to the receiving device 05, the transmitting device 01 is configured to: perform outer-code encoding on the signal, and then transmit, to the transmitting-end optical module 02, a signal on which outer-code encoding has been performed. The transmitting-end optical module 02 is configured to: determine an inner-code encoding scheme based on an optical transmission mode used by the transmitting-end optical module 02 for signal transmission, perform, by using the inner-code encoding scheme, inner-code encoding on the signal on which outer-code encoding has been performed, and transmit, to the channel transmission medium 03, a signal on which inner-code encoding has been performed. The channel transmission medium 03 is configured to transmit, to the receiving-end optical module 04, the signal on which inner-code encoding has been performed. The receiving-end optical module 04 is configured to: determine an inner-code decoding scheme based on an optical transmission mode used by the receiving-end optical module 04 for signal transmission, perform, by using the inner-code decoding scheme, inner-code decoding on the signal on which inner-code encoding has been performed, and transmit, to the receiving device 05, the signal on which inner-code decoding has been performed (that is, a signal on which outer-code decoding is to be performed in FIG. 6). The receiving device 05 is configured to perform outer-code decoding on the signal on which inner-code decoding has been performed.

Corresponding to the functional layers of the devices shown in FIG. 5, the transmitting device 01 may implement a function of performing outer-code encoding on the signal via the first PCS. The receiving device 05 may implement, via the second PCS, a function of performing outer-code decoding on the signal on which inner-code decoding has been performed. The transmitting-end optical module 02 may implement, via the third PMA, a function of performing inner-code encoding on the signal on which outer-code encoding has been performed. The receiving-end optical module 04 may implement, via the fifth PMA, a function of performing inner-code decoding on the signal on which inner-code encoding has been performed. In a possible implementation, an inner-code encoding circuit is disposed in the third PMA, and the inner-code encoding circuit may perform inner-code encoding on the signal on which outer-code encoding has been performed. An inner-code decoding circuit is disposed in the fifth PMA, and the inner-code decoding circuit may perform inner-code decoding on the signal on which inner-code encoding has been performed.

The "inner" in the inner code and the "outer" in the outer code indicate whether an execution body that performs an operation on a signal is relatively close to or far away from a channel transmission medium. The execution body that performs an operation on the inner code is relatively close to the channel transmission medium, and the execution body that performs an operation on the outer code is relatively far away from the channel transmission medium. In this embodiment of this application, a signal is transmitted from the transmitting device 01 to the channel transmission medium 03 via the transmitting-end optical module 02, and then is transmitted from the channel transmission medium 03 to the receiving device 05 via the receiving-end optical module 04. The signal encoded by the transmitting device 01 is far away from the channel transmission medium 03 compared with the signal encoded by the transmitting-end optical module 02, and the signal decoded by the receiving device 05 is far away from the channel transmission medium 03 compared with the signal decoded by the receiving-end optical module 04. Therefore, the signal encoded by the transmitting device 01 is referred to as a signal on which outer-code encoding has been performed, the signal encoded by the transmitting-end optical module 02 is referred to as a signal on which inner-code encoding has been performed, a signal decoded by the receiving device 05 is referred to as a signal on which outer-code decoding has been performed, and a signal decoded by the receiving-end optical module 04 is referred to as a signal on which inner-code decoding has been performed.

The following describes an implementation process of an encoding method according to an embodiment of this application. As shown in FIG. 7, the implementation process of the encoding method includes the following steps.

Step 701: An optical module receives a signal on which outer-code encoding has been performed.

As shown in FIG. 1, in a process in which the transmitting device 01 sends a signal to the receiving device 05, the transmitting device 01 may first perform outer-code encoding on the signal, and send, to the transmitting-end optical module 02, the signal on which outer-code encoding has been performed.

Step 702: The transmitting-end optical module obtains an optical transmission mode used by the transmitting-end optical module for signal transmission. A sequence of steps 701 and 702 is not limited, and the optical transmission mode may alternatively be obtained first.

There are a plurality of implementations in which the transmitting-end optical module obtains the optical transmission mode used by the transmitting-end optical module for signal transmission. In this embodiment of this application, the following three implementations are used as an example for description.

In a first implementation, the transmitting-end optical module receives indication information sent by the transmitting device, and determines the optical transmission mode based on the indication information. The transmitting device is configured to determine the optical transmission mode through negotiation with the receiving device. For example, the transmitting device 01 and the receiving device 05 operate in an Ethernet auto-negotiation (AN) mode to determine the optical transmission mode.

Optionally, that the transmitting-end optical module determines the optical transmission mode based on the indication information includes: the transmitting-end optical module extracts, from the indication information, a parameter used to indicate the optical transmission mode, and determines the optical transmission mode based on the parameter used to indicate the optical transmission mode, where the indication information may carry one or more parameters.

According to the Institute of Electrical and Electronics Engineers (IEEE) 802.3 standard, when the transmitting device and the receiving device operate in an auto-negotiation (AN) mode, both the transmitting device and the receiving device may send a configuration bitstream (configuration, represented as/C/code) to a peer end, so as to perform negotiation by using the configuration bitstream. In the auto-negotiation process, if either the transmitting device or the receiving device receives a plurality of consecutive (e.g., three) identical configuration bitstreams, and an operating mode indicated by the received configuration bitstream matches a local operating mode, the transmitting device or the receiving device returns a configuration bitstream with an acknowledgement (Ack) to the peer end. After receiving the acknowledgement, the peer end confirms that the two ends can interwork with each other. Then, the peer end locks the port status to up (UP). After the port status is locked to UP, the peer end configures the transmitting or receiving modes of the two ends. In addition, after the transmitting device and the receiving device determine the optical transmission mode used for signal transmission through auto-negotiation, the transmitting device and the receiving device may record the determined optical transmission mode in respective registers, and send, to optical modules that are respectively connected to the transmitting device and the receiving device, indication information used to indicate the optical transmission mode, so that the corresponding optical modules can determine the optical transmission mode according to the indication information.

Figure 8:
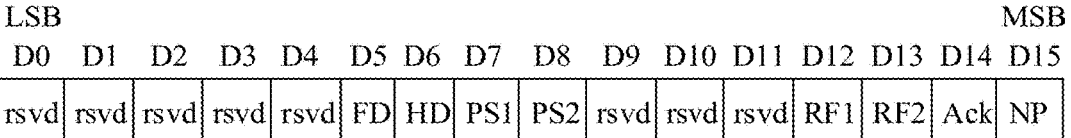
FIG. 8 is a format of encoding information carried in a base page of a register according to an embodiment of this application.

A register base page is encapsulated in the configuration bitstream, and the register base page carries encoding information used to indicate a local operating mode, where the encoding information includes an optical transmission mode locally supported. A format of the encoding information carried in the register base page is shown in FIG. 8, and values carried in different data bits in the encoding information are used to indicate operating modes indicated by the data bits. As shown in FIG. 8, a data bit DO is the least significant bit (LSB), and a data bit D15 is the most significant bit (MSB). In the IEEE 802.3 standard, the data bit DO to a data bit D4, and a data bit D9 to a data bit D11 are all reserved bits (shown as "rsvd" in FIG. 8). A data bit D5 is represented by characters "FD", and is used to indicate whether the transmitting device of the configuration bitstream can operate in a full-duplex (FD) mode. A data bit D6 is represented by characters "HD", and is used to indicate whether the transmitting device of the configuration bitstream can operate in a half-duplex (HD) mode. A data bit D7 is represented by characters "PS1", and is used to indicate whether the transmitting device of the configuration bitstream can perform a full-duplex pause (pause) operation. A data bit D8 is represented by characters "PS2", and is used to indicate whether the transmitting device of the configuration bitstream has a capability of asymmetric pause (asymmetric pause). A data bit D12 is represented by characters "RF1", and a data bit D13 is represented by characters "RF2". The data bit D12 and the data bit D13 jointly indicate whether a transmitting end of the configuration bitstream can advertise a detected remote fault (remote fault). A data bit D14 is represented by characters "Ack", and is used to indicate whether information in the current register base page is received. The data bit D15 is represented by characters "NP", and is used to indicate whether the current register base page is the last page.

TABLE 1

| BK1 | BK2 | Function description |
| --- | --- | --- |
| 0 | 0 | Both the local end and the peer end support the point-to-point optical transmission mode, and the point-to-point optical transmission mode is used between the two ends. |
| 0 | 1 | The local end supports the point-to-point optical transmission mode, the peer end supports the point-to-multipoint optical transmission mode, and the point-to-point optical transmission mode is used between the two ends. |
| 1 | 0 | The local end supports the point-to-multipoint optical transmission mode, the peer end supports the point-to-point optical transmission mode, and the point-to-point optical transmission mode is used between the two ends. |
| 1 | 1 | Both the local end and the peer end support the point-to-multipoint optical transmission mode, and the point-to-multipoint optical transmission mode is used between the two ends. |

In this embodiment of this application, reserved bits in the IEEE 802.3 standard are used to indicate the optical transmission mode supported by the transmitting end of the configuration bitstream. For example, a data bit D10 and the data bit D11 are used to indicate the optical transmission mode. In this case, the data bit D10 may be represented by using "BK1", and the data bit D11 may be represented by using "BK2". As shown in Table 1, when the value of BK1 and the value of BK2 are both logic 1, it indicates that the optical transmission mode is the point-to-multipoint optical transmission mode. When the value of either BK1 or BK2 is logic 1, and the value of the other one is logic 0, it indicates that the optical transmission mode is the point-to-point optical transmission mode. Using the data bit D10 and the data bit D11 to indicate the optical transmission mode, and using the values of BK1 and BK2 to indicate the optical transmission mode are merely examples of indicating the optical transmission mode by using reserved bits. This is not intended to limit an implementation of using reserved bits to indicate the optical transmission mode. For example, the data bit D9 and the data bit D10 may be alternatively used to indicate the optical transmission mode according to an application requirement. Alternatively, when values of BK1 and BK2 are both logic 0, it may be used to indicate that the transmission mode is the point-to-multipoint optical transmission mode. Alternatively, when values of BK1 and BK2 are both logic 1, it may be used to indicate that the transmission mode is the point-to-point optical transmission mode.

In addition, when either the transmitting device or the receiving device is not capable of detecting the optical transmission mode supported by the transmitting device or the receiving device, for example, either the transmitting device or the receiving device does not have an auto-negotiation function, the default point-to-point optical transmission mode is used between the transmitting device and the receiving device. In this case, a value represented by the two reserved bits used to indicate the optical transmission mode may be 0b00. In addition, when a state of the register of either the transmitting device or the receiving device is switched to an idle detection state (e.g., in a case of breakdown or power-off, the state of the register is switched to the idle detection state), a value represented by the two reserved bits used to indicate the optical transmission mode is reset to 0b00.

Optionally, for an implementation of indicating the optical transmission mode in the indication information sent by the transmitting device and the receiving device to the respective connected optical modules, refer to the implementation of indicating the optical transmission mode in Table 1. Details are not described herein again.

In the first implementation, the transmitting device and the receiving device determine the optical transmission mode through auto-negotiation, and the transmitting-end optical module receives the indication information sent by the transmitting device, and determines the optical transmission mode based on the indication information. Therefore, the optical transmission mode can be determined in a relatively simple manner with no additional calculation or storage cost. In addition, when determining the optical transmission mode through auto-negotiation, the transmitting device can use reserved bits in the encoding information with no additional operation cost, which simplifies a manner of determining the optical transmission mode.

In a second implementation, the transmitting-end optical module receives indication information sent by the transmitting device, and determines the optical transmission mode based on the indication information. The transmitting device is configured to determine the optical transmission mode. For example, the transmitting device may receive a control stream sent by a network controller, where the control stream is used to indicate the transmitting device to send the optical transmission mode used by the transmitting device, and the media access control (MAC) layer of the transmitting device can determine, based on the control stream, the optical transmission mode used for signal transmission.

Optionally, that the transmitting-end optical module determines the optical transmission mode based on the indication information includes: the transmitting-end optical module extracts, from the indication information, a parameter used to indicate the optical transmission mode, and determines the optical transmission mode based on the parameter used to indicate the optical transmission mode, where the indication information carries one or more parameters.

In a possible implementation, the MAC layer of the transmitting device may determine the optical transmission mode, and send, to a PCS of the transmitting device, a signal that carries the optical transmission mode. The PCS may determine the optical transmission mode based on the signal, and send the indication information to the transmitting-end optical module, so that the transmitting-end optical module determines the optical transmission module based on the indication information. For example, as shown in FIG. 5, after receiving a signal sent by the MAC layer, the first PCS of the transmitting device 01 first encodes the signal to obtain encoding information (e.g., 64B/66B encoding information), and then the first PCS may determine the optical transmission mode based on the encoding information, and send indication information to the transmitting-end optical module. The transmitting-end optical module is configured to determine the optical transmission mode based on the indication information. 64B/66B is a format of the encoding information, where 66B indicates that a total length of the encoding information is 66 bits, and 64B indicates that a payload in the encoding information occupies 64 bits.

Optionally, a default field in the encoding information may be used to indicate the optical transmission mode, and the optical transmission mode may be determined based on content carried in the default field. For example, refer to the IEEE 802.3 standard. The standard defines usage of some flags. For example, a flag D represents a data byte, and DO to D7 represent eight data bytes; a flag C represents a control byte, and C0 to C7 represent eight control bytes located in different positions; a flag S represents a start byte; a flag T represents an end byte; and a flag O represents a sequence ordered set. In addition, Table 2 provides an example of usage of some other flags defined in the standard. These flags are used to indicate a control block format. When the values of the bytes are different, the control block format has different values of the block type field (block type field), and different values of the block type field are used to indicate different operating states. As shown in Table 3, the defined values of the block type field are 0x1E, 0x78, 0x4B, 0x87, 0x99, 0xAA, 0xB4, 0xCC, 0xD2, 0xE1, and 0xFF. These values of the block type field represent the following control block formats: C0C1C2C3C4C5C6C7, S0D1D2D3D4D5D6D7, 00D1D2D3Z4Z5Z6Z7, T0C1C2C3C4C5C6C7, D0T1C2C3C4C5C6C7, D0D1T2C3C4C5C6C7, D0D1D2T3C4C5C6C7, D0D1D2D3T4C5C6C7, D0D1D2D3D4T5C6C7, D0D1D2D3D4D5T6C7, and D0D1D2D3D4D5D6T7. C0C1C2C3C4C5C6C7 indicates that an error occurs during transmission. S0D1D2D3D4D5D6D7 indicates that a data packet starts to be transmitted. 00D1D2D3Z4Z5Z6Z7 indicates a capability of sending control and status information (e.g., a remote fault status and a local fault status) through a link. T0C1C2C3C4C5C6C7, D0T1C2C3C4C5C6C7, D0D1T2C3C4C5C6C7, D0D1D2T3C4C5C6C7, D0D1D2D3T4C5C6C7, D0D1D2D3D4T5C6C7, D0D1D2D3D4D5T6C7, and D0D1D2D3D4D5D6T7 indicate that the data packet transmission is terminated.

TABLE 2

| Control characters | Tag | Control code |
|---|---|---|
| Idle (idle) | /I/ | 0x00 |
| Low-power insert (low power insert, LPI) | /LI/ | 0x06 |
| Start (start) | /S/ | Encoding by using the value of the block type field |
| Terminate (terminate) | /T/ | Encoding by using the value of the block type field |
| Error (error) | /E/ | 0x1E |
| Sequence ordered set (sequence ordered set) | /Q/ | The value of the block type field is 0x4B + O code, and the control code is set to 0x00. |
| Point-to-multipoint optical transmission mode (breakout mode) | /B/ | One of 0x2D, 0x33, 0x55, and 0x66 |

The optical transmission mode may be represented by using an undefined value of the block type field. For example, according to the indication in the IEEE 802.3 standard, the Hamming distance between the values of the block type field in the 64B/66B encoding needs to be maintained as 4. In addition to the used values of the block type field, there are five unused values of the block type field that maintain such Hamming distance: 0x00, 0x2D, 0x33, 0x55, and 0x66. In this case, any one of the five unused values of the block type field may be used to indicate the optical transmission mode. Alternatively, because 0x00 may easily conflict with the default value, any one of 0x2D, 0x33, 0x55, and 0x66 may be used to indicate the optical transmission mode.

TABLE 3

| Input data (input data) | Synchronization (sync) | | Block payload (block payload) | | | | | | | |
|---|---|---|---|---|---|---|---|---|---|---|
| Bit position (bit position): | 0 | 1 | 2 | | | | | | | 65 |
| Data block format (data block format): | | | | | | | | | | |
| D0D1D2D3D4D5D6D7 | 01 | | D0 | D1 | D2 | D3 | D4 | D5 | D6 | D7 |
| Control block formats (control block formats): | | | Block type field value | | | | | | | |
| C0C1C2C3C4C5C6C7 | 10 | | 0x1E | C0 | C1 | C2 | C3 | C4 | C5 | C6 |
| ... | 10 | | ... | ... | ... | ... | ... | ... | ... | ... |
| D0D1D2D3D4D5D6T7 | 10 | | 0xFF | D0 | D1 | D2 | D3 | D4 | D5 | D6 |
| B0D1D2D3D4D5D6D7 | 10 | | 0x2D | D0 | D1 | D2 | D3 | D4 | D5 | D6 |

Based on this, to represent the optical transmission mode, as shown in the bold rows in Table 2 and Table 3, a tag B may be added to an existing standard, and the tag B is used to represent the point-to-multipoint optical transmission mode. In addition, the format of the control block that includes the flag B may be B0D1D2D3D4D5D6D7 and the like, and a value of the block type field in the control block format may be any one of 0x2D, 0x33, 0x55, and 0x66. Correspondingly, when the transmitting-end module (e.g., the first PCS of the transmitting-end module) obtains, through parsing, that a field of the 64B/66B encoding information includes the control block including the tag B, it may be determined that the optical transmission mode is the point-to-multipoint optical transmission mode. Indication information used to indicate the point-to-multipoint optical transmission mode needs to be generated, and the indication information is sent to the transmitting-end optical module (e.g., a third PMA of the transmitting-end optical module), so that the transmitting-end optical module determines the optical transmission mode based on the indication information. When the transmitting-end module obtains, through parsing, that a field of the 64B/66B encoding information does not include the control block including the flag B, it may be determined that the optical transmission mode is the point-to-point optical transmission mode. Indication information used to indicate the point-to-point optical transmission mode needs to be generated, and the indication information is sent to the transmitting-end optical module, so that the transmitting-end optical module determines the optical transmission mode based on the indication information.

In addition, to ensure validity of the information transmitted by using the flag B, a position of the flag B in the control block format may be further specified. For example, it may be specified that the flag B is located in the first byte in the control block format. When the flag B is located in the first byte in the control block format, the optical transmission mode indicated by the flag B is valid, and the flag B that is read from another byte indicates an error. In addition, by placing the flag B in the first byte in the control block format, the payload may be transmitted by using the second and subsequent bytes in the control block format, thereby ensuring ordered payload transmission.

In the second implementation, the transmitting device determines the optical transmission mode, and the transmitting device sends, to the transmitting-end optical module, the indication information indicating the optical transmission mode, so that the optical transmission mode can be determined in a relatively simple manner with no additional calculation or storage cost. In addition, a default field in the encoding information encoded by a first PCS is used to indicate the optical transmission mode, and reserved bits in the encoding information are used with no additional operation cost, which simplifies a manner of determining the optical transmission mode.

In a third implementation, the transmitting-end optical module determines the optical transmission mode based on a configuration operation performed by the control device on the transmitting-end optical module. The control device may be a device such as a host computer that is used by an administrator to manage the transmitting-end optical module. For example, before a data center is constructed, an administrator of the data center may configure the transmitting-end optical module by using a computer, and the configuration includes indicating an optical transmission mode through a configuration operation.

Optionally, the transmitting-end optical module includes a memory, and the configuration operation includes a write operation performed on an identifier that is in the memory and that indicates the optical transmission mode. Correspondingly, the transmitting-end optical module may determine the optical transmission mode by reading the identifier that is in the memory and that indicates the optical transmission mode.

Figure 9:
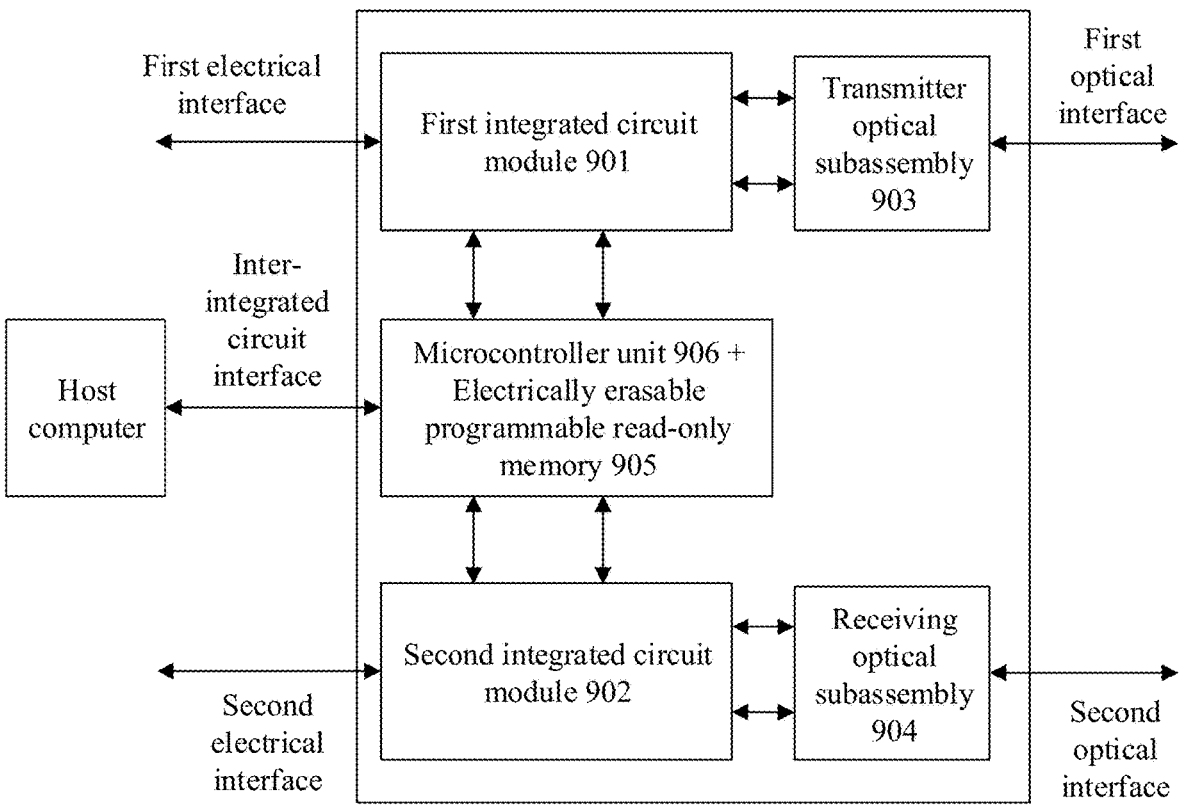
FIG. 9 is a schematic diagram of an optical module according to an embodiment of this application.

In a possible implementation, as shown in FIG. 9, the optical module includes a first integrated circuit (IC) module 901, a second integrated circuit module 902, a transmitter optical subassembly (TOSA) 903, a receiving optical subassembly (ROSA) 904, an electrically erasable programmable read-only memory (EEPROM) 905, and a microcontroller unit (MCU) 906. In addition, a first electrical interface, a second electrical interface, a first optical interface, a second optical interface, and an inter-integrated circuit (I2C) bus interface are disposed on the optical module, where the first electrical interface is connected to an input end of the first integrated circuit module, the second electrical interface is connected to an output end of the second integrated circuit module, the first optical interface is connected to an output end of the transmitter optical subassembly, and the second optical interface is connected to an input end of the receiving optical subassembly.

The microcontroller unit is configured to control each component in the optical module. The first integrated circuit module is configured to: receive an electrical signal from the first electrical interface, perform processing such as encoding on the electrical signal, and transmit the processed electrical signal to the transmitter optical subassembly. The transmitter optical subassembly is configured to: convert an electrical signal processed by the first integrated circuit module into an optical signal, and output the converted optical signal through the first optical interface. The receiving optical assembly is configured to: receive an optical signal input from the second optical interface, convert the optical signal into an electrical signal, and transmit the converted electrical signal to the second integrated circuit. The second integrated circuit is configured to: perform processing such as decoding on the converted electrical signal, and output the processed electrical signal through the second electrical interface. The electrically erasable programmable read-only memory is configured to store information such as a performance parameter, manufacturer information, a component model, and a component version number of the optical module. The I2C bus interface integrated in the optical module is configured to connect the optical module to a control device (the host computer shown in FIG. 9). In addition, the first integrated circuit module includes the foregoing inner-code encoding circuit, and the second integrated circuit module includes the foregoing inner-code decoding circuit.

In this embodiment of this application, the memory in the optical module may be an electrically erasable programmable read-only memory, and an identifier used to indicate an optical transmission mode is set in the electrically erasable programmable read-only memory. The electrically erasable programmable read-only memory is a user-modifiable read-only memory (ROM), and data recorded in the electrically erasable programmable read-only memory may be erased and rewritten by using a programmable voltage. In addition, the data in the electrically erasable programmable read-only memory may be modified by using a byte (Byte) as a minimum modification unit. Therefore, when data is written to the electrically erasable programmable read-only memory, the write can be implemented without clearing all the data in the electrically erasable programmable read-only memory.

Correspondingly, when the optical module is used as the transmitting-end optical module, the first integrated circuit module may read the identifier that is in the electrically erasable programmable read-only memory and that indicates the optical transmission mode, and determine the optical transmission mode according to the identifier. When the optical module is used as a receiving-end optical module, the second integrated circuit module may read an identifier that is in the electrically erasable programmable read-only memory and that indicates the optical transmission mode, and determine the optical transmission mode according to the identifier.

It should be noted that the third implementation may be performed in a process of establishing or reconstructing a data center, and the configuration operation does not need to be performed in a process of transmitting a signal by using the data center. Each time data is transmitted, the optical transmission mode may be determined based on a configuration result of the configuration operation. In addition, because the third implementation is realized by performing operations on the optical module by using an external control device, implementation logic of the optical module does not need to be changed each time the optical transmission mode is changed. Therefore, a configuration operation of writing the optical transmission mode into the optical module can be implemented without interrupting data transmission of the optical module. In addition, in the third implementation, the optical transmission mode is configured through software configuration, and no additional overhead is required, so that the implementation is simple, and a transmission cost of the data center network is reduced.

Step 703: The transmitting-end optical module determines, based on the optical transmission mode, an inner-code encoding scheme to be used by the transmitting-end optical module to perform inner-code encoding on the signal on which outer-code encoding has been performed.

After determining the optical transmission mode, the transmitting-end optical module may select, according to the optical transmission mode, the inner-code encoding scheme from the plurality of encoding schemes supported by the transmitting-end optical module. In a possible implementation, a correspondence between an optical transmission mode and an encoding scheme is built in the transmitting-end optical module, and an implementation process of step

703 includes: the transmitting-end optical module queries the correspondence between an optical transmission mode and an encoding scheme based on the optical transmission mode, to obtain the inner-code encoding scheme.

Optionally, the correspondence between an optical transmission mode and an encoding scheme includes: the point-to-point optical transmission mode corresponds to a spatially coupled encoding scheme, and the point-to-multipoint optical transmission mode corresponds to a block algebraic encoding scheme. The spatially coupled encoding scheme includes: encoding by using a zipper code, and the block algebraic encoding scheme includes: encoding by using a Hamming code or a BCH code.

In the point-to-point optical transmission mode, a spatially coupled encoding scheme (e.g., a zipper code) is selected, so that inner-code encoding that features high speed, high performance, low power consumption and meets a requirement for a delay indicator can be implemented. In the point-to-multipoint optical transmission mode, a block algebraic encoding scheme (e.g., a Hamming code or a BCH code) is selected, so that flexible and configurable inner-code encoding with an ultra-low delay can be implemented, so as to ensure a delay requirement in the point-to-multipoint optical transmission mode.

Step 704: The transmitting-end optical module performs, by using the inner-code encoding scheme, inner-code encoding on the signal on which outer-code encoding has been performed, and outputs a signal on which inner-code encoding has been performed.

After determining the inner-code encoding scheme, the transmitting-end optical module may perform, by using the inner-code encoding scheme, inner-code encoding on the signal on which outer-code encoding has been performed. A process of performing inner-code encoding on the signal on which outer-code encoding has been performed is essentially a process of adding a check bit on a basis of the signal on which outer-code encoding has been performed, so as to correct a transmitted signal by using a check code. In addition, because a signal on which outer-code encoding has been performed is obtained by performing outer-code encoding on the signal, after inner-code encoding is performed on the signal on which outer-code encoding has been performed, an entire process of performing outer-code encoding and inner-code encoding on the signal may be considered as concatenated encoding on the signal, and the signal that is obtained by performing inner-code encoding on the signal on which outer-code encoding has been performed may also be referred to as a concatenated code.

In this embodiment of this application, for different encoding schemes corresponding to a point-to-point optical transmission mode and a point-to-multipoint optical transmission mode, encoding in the different encoding schemes may be implemented via a same optical module. In a possible implementation, as shown in FIG. 10 and FIG. 11, the optical module includes a selection subassembly 1 and a component code encoder 2, and an implementation process of step 704 includes: the selection subassembly 1 selects a target candidate signal from a plurality of candidate signals according to an inner-code encoding scheme, and provides the target candidate signal to the component code encoder 2; and the component code encoder 2 performs, based on the target candidate signal, inner-code encoding on the signal on which outer-code encoding has been performed.

It can be learned that, in the optical module provided in this embodiment of this application, impact of different encoding schemes on an encoding process is represented as impact on the target candidate signal that is used by the component code encoder 2 to perform inner-code encoding. In addition, the selection subassembly 1 is disposed in the optical module, and the selection subassembly 1 can select candidate signals according to an encoding scheme, and can switch between different encoding schemes in the same optical module, so that the optical module can encode signals according to different encoding schemes. Compared with the implementation of switching between different optical modules to use different encoding schemes for encoding, this effectively improves efficiency of encoding signals by using different encoding schemes, improves compatibility of the optical module, and increases area and power consumption advantages of the optical modules.

Figure 10:
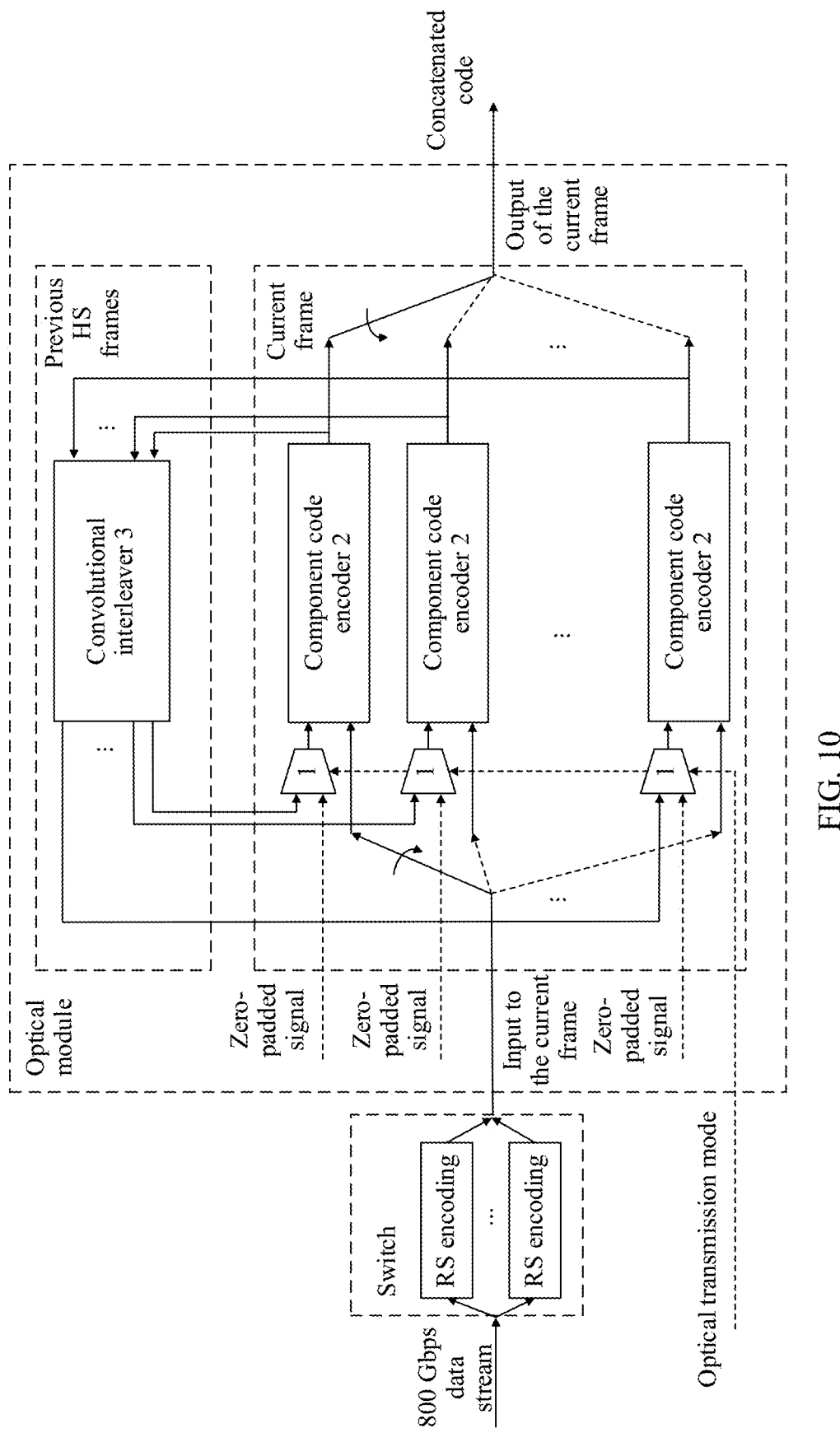
FIG. 10 is a schematic diagram of a structure of an optical module according to an embodiment of this application.
Figure 11:
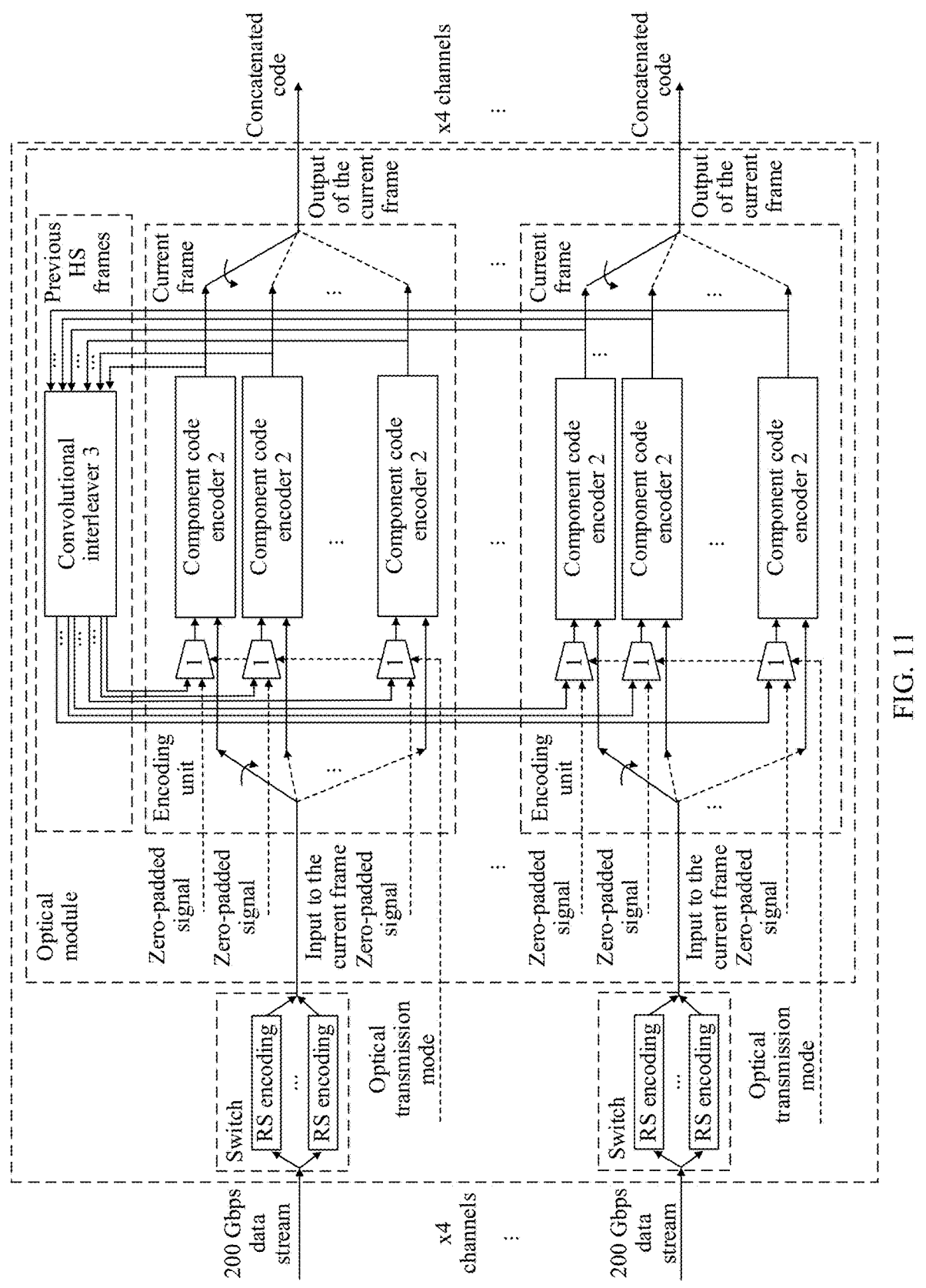
FIG. 11 is a schematic diagram of a structure of another optical module according to an embodiment of this application.

The following uses the optical modules shown in FIG. 10 and FIG. 11 as an example to describe a process of encoding by using an encoding scheme corresponding to the 800 Gbps point-to-point optical transmission mode and a process of encoding by using an encoding scheme corresponding to the 800 Gbps (4*200 Gbps) point-to-multipoint optical transmission mode.

The optical module shown in FIG. 10 is configured to perform encoding by using an encoding scheme corresponding to the 800 Gbps point-to-point optical transmission mode. As shown in FIG. 10, a switch is used as a transmitting device, and the switch (e.g., a PCS of the switch) sequentially distributes a received 800 Gbps data stream to x (e.g., a multiple of 2 such as 2, 4, 6, or 8) RS encoders at a granularity of y1-bit (bit) (e.g., 10-bit) in a polling manner, and performs outer-code encoding (that is, performing RS encoding) on a signal by using the x RS code words. The RS code words obtained after outer-code encoding is performed are sequentially distributed, through multiplexing, to a plurality of (assumed to be 32 in FIG. 10) component code encoders 2 (belonging to the PMA layer of the optical module) at a granularity of y2-bit (e.g., 10-bit) in a polling manner. In addition, according to the point-to-point optical transmission mode, the selection subassembly 1 selects, from a zero-padded signal and a signal output by a convolutional interleaver 3, the signal output by the convolutional interleaver 3 as a target candidate signal, and provides the target candidate signal to the plurality of component code encoders 2. The component code encoder 2 uses the target candidate signal as the mirror bits, and integrates the mirror bits and information bits obtained through distribution in a spatially coupled encoding scheme (e.g., a zipper code), to obtain check bits of the RS code words on which outer-code encoding have been performed, so as to implement inner-code encoding of the RS code words on which outer-code encoding have been performed. In this case, the signal obtained after inner-code encoding is performed on the RS code words on which outer-code encoding have been performed is referred to as a concatenated code (RS+zipper concatenated code). After the concatenated code is obtained through encoding, signals on which a plurality of component code encoders 2 have performed inner-code encoding are sequentially output at a granularity of y3-bit (e.g., 1-bit) in a polling manner, for example, output to a next PMA layer (not shown in FIG. 10) of the optical module. After performing digital signal processing on the signal obtained after the inner-code encoding, the next PMA layer transmits the processed signal to the PMD layer (not shown in FIG. 10) of the optical module. After modulating the signals and performing optical-to-electrical conversion, the PMD transmits the optical signals obtained after the optical-to-electrical conversion to the receiving device through a channel transmission medium such as an optical fiber.

The optical module shown in FIG. 11 is configured to perform encoding by using an encoding scheme corresponding to the 4*200 Gbps point-to-multipoint optical transmission mode. Because in the point-to-multipoint optical transmission mode, signals need to be transmitted through four channels, four groups of encoding units are required for implementation of the encoding process of the point-to-multipoint optical transmission mode. The four groups of encoding units respectively correspond to four PCSs. The four groups of encoding units share one convolutional interleaver 3, and correspond to the optical module shown in FIG. 10. Each group of encoding units includes eight component code encoders 2 and eight selection subassemblies 1. The following uses an encoding process of one group of encoding units as an example for description.

As shown in FIG. 11, a switch is used as a transmitting device, and the switch (e.g., a PCS of the switch) sequentially distributes a received 200 Gbps data stream to x (e.g., a multiple of 2 such as 2, 4, 6, or 8) RS code words at a granularity of y1-bit (e.g., 10-bit) in a polling manner, and performs outer-code encoding on a signal by using the x RS code words. The RS code words obtained after outer-code encoding is performed are sequentially distributed, through multiplexing, to a plurality of (8 in FIG. 11) component code encoders 2 (belonging to the PMA layer of the optical module) at a granularity of y2-bit (e.g., 10-bit) in a polling manner. In addition, according to the point-to-multipoint optical transmission mode, the selection subassembly 1 selects, from a zero-padded signal and the signal output by the convolutional interleaver 3, the zero-padded signal as the target candidate signal, and provides the target candidate signal to the plurality of component code encoders 2. The component code encoder 2 uses the target candidate signal as the mirror bits, and integrates the mirror bits and the information bits obtained through distribution in a spatially coupled encoding scheme (e.g., a BCH code), to obtain check bits of the RS code words on which outer-code encoding have been performed, so as to implement inner-code encoding of the RS code words on which outer-code encoding have been performed. In this case, the signal obtained after inner-code encoding is performed on the RS code words on which outer-code encoding have been performed is referred to as a concatenated code (RS+BCH concatenated code). After the concatenated code is obtained through encoding, signals on which a plurality of component code encoders 2 have performed inner-code encoding are sequentially output at a granularity of y3-bit (e.g., 2-bit) in a polling manner, for example, output to a next PMA layer (not shown in FIG. 11) of the optical module. After performing digital signal processing on the signal obtained after the inner-code encoding, the next PMA layer transmits the processed signal to the PMD layer (not shown in FIG. 11) of the optical module. After modulating the signals and performing optical-to-electrical conversion, the PMD transmits the optical signals obtained after the optical-to-electrical conversion to the receiving device through a channel transmission medium such as an optical fiber.

The RS code word may be obtained by KP4 FEC encoding in CL119, that is, RS (544, 514, 10), or may be another RS code word such as RS (560, 514, 10) or RS (576, 514, 10). In RS (a1, a2, a3), a1 represents a symbol length of the RS code word, a2 represents a symbol length of a payload in the RS code word, a3 represents a quantity of bits occupied by each symbol, and a difference between a1 and a2 represents a symbol length of a check code in the RS code word. A granularity of distribution to the RS code word and a granularity of distribution to the component code encoder

2 may be the same or different. When the granularities of the two are the same, a probability that a decoding error occurs in the receiving device is low. In addition, in the point-to-point optical transmission mode and the point-to-multipoint optical transmission mode, signals that are obtained after inner-code encoding may be output at the same or different granularities. The signal output by the convolutional interleaver 3 is data obtained after the convolutional interleaver 3 processes the data of previous HS frames output by the plurality of component code encoder 2. The zero-padded signal may be generated by an integrated circuit module in the optical module. HS is also referred to as a coupling degree, indicating a degree of correlation between a current frame and previous frames.

It should be noted that arrows in FIG. 10 and FIG. 11 are used to indicate a signal stream direction in the encoding process, and are not intended to limit a specific implementation of signal transmission. For example, in FIG. 10 and FIG. 11, an arrow pointing from the switch to the optical module indicates that a signal is transmitted from the switch to the optical module, and is not used to limit a specific transmission manner in which the signal output by the switch is transmitted to the optical module. In an example of a transmission manner, an attachment unit interface (AUI) may be disposed at an output end of the switch, and the switch may transmit a signal to the optical module through the attachment unit interface, AUI. An AUI includes a plurality of pins. AUIs of different models include different quantities of pins, and when the quantities of pins of the AUIs are different, transmission rates of the pins of the AUIs are different. For example, when an AUI includes 16 pins, a transmission rate of each pin is 50 Gbps. When an AUI includes eight pins, a transmission rate of each pin is 100 Gbps. When an AUI includes four pins, a transmission rate of each pin is 200 Gbps. An example in which an AUI includes eight pins is used herein to describe an implementation process in which the switch transmits a signal to the optical module through the AUI and that is shown in FIG. 10 and FIG. 11. Corresponding to the optical module including four encoding units in FIG. 11, the 32 component code encoders in both FIG. 10 and FIG. 11 may be divided into four groups: The first group includes the first component code encoder to the eighth component code encoder; the second group includes the ninth component code encoder to the sixteenth component code encoder; the third group includes the seventeenth component code encoder to the twenty-fourth component code encoder; and the fourth group includes the twenty-fifth component code encoder to the thirty-second component code encoder. Similarly, the eight pins of the AUI may be divided into four groups: The first group includes the first pin and the second pin; the second group includes the third pin and the fourth pin; the third group includes the fifth pin and the sixth pin; and the fourth group includes the seventh pin and the eighth pin. The $i^{th}$ group of pins are configured to transmit signals to the $i^{th}$ group of component code encoders; and after receiving the signals transmitted by the $i^{th}$ group of pins, the optical module first aggregates the received signals, and then distributes the signals to the component code encoders in the $i^{th}$ group of component code encoders at a granularity in a polling manner.

In addition, although the foregoing FIG. 10 and FIG. 11 are described by using the 800 Gbps transmission scenario as an example, this does not limit that the inventive concept of this application can be used only in this transmission scenario. For example, the encoding method may also be applicable to a higher-speed transmission scenario such as 1.6 terabits per second (Tbps). In addition, the inventive concept of this application may also be used in another technical field, for example, may also be used in transmission scenarios such as fronthaul, midhaul, and backhaul of a base station.

It can be learned from the foregoing that, in the encoding method provided in this embodiment of this application, the optical module can determine, according to an optical transmission mode used by the optical module for signal transmission, an inner-code encoding scheme to be used by the optical module to perform inner-code encoding on the signal on which outer-code encoding has been performed, and then perform, by using the inner-code encoding scheme, inner-code encoding on the signal on which outer-code encoding has been performed. In this implementation, the inner-code encoding scheme can be determined based on the optical transmission mode used by the optical module for signal transmission, so that an appropriate encoding scheme can be selected based on different transmission scenarios, and signal transmission performance in different transmission scenarios can be ensured, for example, transmission performance such as error correction performance, a delay requirement, and an energy consumption requirement in a transmission process can be met.

The following describes an implementation process of a decoding method according to an embodiment of this application. As shown in FIG. 12, an implementation process of the decoding method includes the following steps.

Step 1201: A receiving-end optical module obtains an optical transmission mode used by the receiving-end optical module for signal transmission.

There are a plurality of implementations in which the receiving-end optical module obtains the optical transmission mode used by the receiving-end optical module for signal transmission. In this embodiment of this application, the following three implementations are used as an example for description.

In a first implementation, the receiving-end optical module receives indication information from a receiving device, and determines the optical transmission mode based on the indication information, where the indication information of the receiving device is obtained through Ethernet auto-negotiation between the receiving device and a transmitting device, or the indication information of the receiving device is obtained from a network controller. Optionally, that the receiving-end optical module determines the optical transmission mode based on the indication information includes: the receiving-end optical module extracts, from the indication information, a parameter used to indicate the optical transmission mode, and determines the optical transmission mode based on the parameter used to indicate the optical transmission mode, where the indication information carries one or more parameters. For an implementation process of the first implementation of step 1201, refer to the implementation processes of the first implementation and the second implementation of step 702. Details are not described herein again.

In a second implementation, the receiving-end optical module determines the optical transmission mode based on a configuration operation performed by a control device on the receiving-end optical module. Optionally, the receiving-end optical module includes a memory, and the configuration operation includes: a write operation performed on an identifier that is in the memory and that indicates the optical transmission mode. Correspondingly, the receiving-end optical module may determine the optical transmission mode by reading the identifier that is in the memory and that indicates the optical transmission mode. For an implementation process of the second implementation of step 1201, refer to the implementation process of the third implementation of step 702. Details are not described herein again.

Step 1202: The receiving-end optical module determines, based on the optical transmission mode, an inner-code decoding scheme to be used by the receiving-end optical module to perform inner-code decoding on a signal.

After determining the optical transmission mode, the receiving-end optical module may select, based on the optical transmission mode, the inner-code decoding scheme from a plurality of decoding schemes supported by the receiving-end optical module. In a possible implementation, a correspondence between an optical transmission mode and a decoding scheme is built in the receiving-end optical module, and an implementation process of step 1202 includes: the receiving-end optical module queries, based on the optical transmission mode, the correspondence between an optical transmission mode and a decoding scheme, to obtain the inner-code decoding scheme.

Optionally, the correspondence between the optical transmission mode and the decoding scheme includes: the point-to-point optical transmission mode corresponds to a spatially coupled decoding scheme, and the point-to-multipoint optical transmission mode corresponds to a block algebraic decoding scheme. The spatially coupled decoding scheme includes: decoding by using a zipper code; and the block algebraic decoding scheme includes: decoding by using a Hamming code or a BCH code.

In the point-to-point optical transmission mode, a spatially coupled decoding scheme (e.g., a zipper code) is selected, so that inner-code decoding that features high speed, high performance, low power consumption and meets a requirement for a delay indicator can be implemented. In the point-to-multipoint optical transmission mode, a block algebraic decoding scheme (e.g., a Hamming code or a BCH code) is selected, so that flexible and configurable inner-code decoding with an ultra-low delay can be implemented, so as to ensure a delay requirement in the point-to-multipoint optical transmission mode.

Step 1203: The receiving-end optical module receives the signal on which inner-code decoding is to be performed, and performs inner-code decoding on the signal by using the inner-code decoding scheme. A process in which the receiving-end optical module receives the signal on which inner-code decoding is to be performed is not limited to a sequence of step 1201. Alternatively, the receiving-end optical module may first receive the signal on which inner-code decoding is to be performed, and then obtain the optical transmission mode.

After determining the inner-code decoding scheme, the receiving-end optical module may perform, by using the inner-code decoding scheme, inner-code decoding on the signal received from the channel transmission medium. A process of performing inner-code decoding on the signal received by the channel transmission medium is essentially a process of removing a check bit from the signal received by the channel transmission medium.

In this embodiment of this application, for different decoding schemes corresponding to a point-to-point optical transmission mode and a point-to-multipoint optical transmission mode, decoding in the different decoding schemes may be implemented via a same optical module. In a possible implementation, as shown in FIG. 10 and FIG. 11, the optical module includes a selection subassembly 1 and a component code decoder 2. An implementation process of step 1203 includes: the selection subassembly 1 selects a target candidate signal from a plurality of candidate signals according to an inner-code decoding scheme, and provides the target candidate signal to the component code decoder 2; and the component code decoder 2 performs inner-code decoding on the signal based on the target candidate signal. For an implementation process of implementing decoding in different decoding schemes via a same optical module, refer to an implementation process of implementing encoding in different encoding schemes via a same optical module in step 704. Details are not described herein again.

It can be learned that, in the optical module provided in this embodiment of this application, impact of different decoding schemes on a decoding process is represented as impact on the target candidate signal used by the component code decoder to perform inner-code decoding. In addition, the selection subassembly is disposed in the optical module, and the selection subassembly can select candidate signals according to a decoding scheme, and can switch between different decoding schemes in the same optical module, so that the optical module can decode signals according to different decoding schemes. Compared with the implementation of switching between different optical modules to use different decoding schemes for decoding, this effectively improves efficiency of decoding signals by using different decoding schemes, improves compatibility of the optical module, and increases area and power consumption advantages of the optical modules.

Step 1204: The receiving-end optical module outputs a signal on which inner-code decoding has been performed, so as to perform outer-code decoding on the signal on which inner-code decoding has been performed.

After performing the inner-code decoding on the signal, the receiving-end optical module needs to output the signal on which inner-code decoding has been performed to the receiving device, so that the receiving device performs outer-code decoding on the signal on which inner-code decoding has been performed, to complete a process of sending data from the transmitting device to the receiving device. After performing inner-code decoding on the signal, the receiving-end optical module may output the signal on which inner-code decoding has been performed, for example, to the PCS of the switch according to an inverse operation of the foregoing operation of distributing, at a granularity of y2-bit (e.g., 10-bit) in a polling manner, the signal on which outer-code encoding has been performed, so that the PCS of the switch performs outer-code decoding on x RS code words. The RS code words used in the decoding process are the same as the RS code words used in the encoding process.

It can be learned from the foregoing that, in the decoding method provided in this embodiment of this application, the optical module can determine, based on the optical transmission mode used by the optical module for signal transmission, the inner-code decoding scheme to be used by the optical module to perform inner-code decoding on the signal, and then perform inner-code decoding on the signal by using the inner-code decoding scheme. In this implementation, the inner-code decoding scheme can be determined based on the optical transmission mode used by the optical module for signal transmission, so that an appropriate decoding scheme can be selected based on different transmission scenarios, and signal transmission performance in different transmission scenarios can be ensured, for example, transmission performance such as error correction performance, a delay requirement, and an energy consumption requirement in a transmission process can be met.

It should be noted that a sequence of the steps of the encoding method and the decoding method provided in embodiments of this application may be properly adjusted, or the steps may be correspondingly added or deleted based on a situation. Any method variation readily figured out by any person skilled in the art within the technical scope disclosed in this application shall fall within the protection scope of this application. Therefore, details are not described herein again.

An embodiment of this application provides an optical module. The optical module is configured to implement the encoding method provided in the embodiments of this application. As shown in FIG. 13, the optical module 130 includes: an input unit 1301, configured to receive a signal on which outer-code encoding has been performed; an encoding unit 1302, configured to: obtain an optical transmission mode used by an optical module for signal transmission, and determine, based on the optical transmission mode, an inner-code encoding scheme for performing inner-code encoding on the signal on which outer-code encoding has been performed, where the encoding unit 1302 is further configured to perform, by using an inner-code encoding scheme, inner-code encoding on the signal on which outer-code encoding has been performed; and an output unit 1303, configured to output a signal on which inner-code encoding has been performed.

Optionally, the encoding unit 1302 is specifically configured to: receive indication information from a transmitting device, and determine the optical transmission mode based on the indication information.

Optionally, the indication information of the transmitting device is obtained through Ethernet auto-negotiation between the transmitting device and the receiving device, or the indication information of the transmitting device is obtained from a network controller.

Optionally, that the encoding unit 1302 determines the optical transmission mode based on the indication information includes: extracting, from the indication information, a parameter used to indicate the optical transmission mode, and determining the optical transmission mode based on the parameter used to indicate the optical transmission mode, where the indication information carries one or more parameters.

Optionally, the optical module includes a memory, and the encoding unit 1302 is specifically configured to determine the optical transmission mode based on a write operation performed by a control device on an identifier that is in the memory and that indicates the optical transmission mode.

Optionally, the encoding unit 1302 includes a selection subassembly and a component code encoder, where the selection subassembly is configured to: select a target candidate signal from a plurality of candidate signals according to an inner-code encoding scheme, and provide the target candidate signal to the component code encoder. The component code encoder is configured to perform, based on the target candidate signal, inner-code encoding on the signal on which outer-code encoding has been performed.

Optionally, the optical transmission mode includes a point-to-point optical transmission mode or a point-to-multipoint optical transmission mode; in the point-to-point optical transmission mode, the signal is transmitted from the transmitting device to the receiving device by using a single channel; and in the point-to-multipoint optical transmission mode, the signal is transmitted from the transmitting device to the receiving device in a single channel-to-multichannel manner.

Optionally, the encoding unit 1302 is specifically configured to query a correspondence between an optical transmission mode and an encoding scheme based on the optical transmission mode, to obtain an inner-code encoding scheme. The correspondence between an optical transmission mode and an encoding scheme includes: the point-to-point optical transmission mode corresponds to a spatially coupled encoding scheme, and the point-to-multipoint optical transmission mode corresponds to a block algebraic encoding scheme.

Optionally, the spatially coupled encoding scheme includes: encoding by using a zipper code; and the block algebraic encoding scheme includes: encoding by using a Hamming code or a BCH code.

It can be learned from the foregoing that, in the optical module provided in this embodiment of this application, the optical module can determine, according to an optical transmission mode used by the optical module for signal transmission, an inner-code encoding scheme to be used by the optical module to perform inner-code encoding on a signal on which outer-code encoding has been performed, and then perform, by using the inner-code encoding scheme, inner-code encoding on the signal on which outer-code encoding has been performed. In this implementation, the inner-code encoding scheme can be determined based on the optical transmission mode used by the optical module for signal transmission, so that an appropriate encoding scheme can be selected based on different transmission scenarios, and signal transmission performance in different transmission scenarios can be ensured, for example, transmission performance such as error correction performance, a delay requirement, and an energy consumption requirement in a transmission process can be met.

It may be clearly understood by a person skilled in the art that, for the purpose of convenient and brief description, for a detailed operating process of the foregoing optical modules and units, reference may be made to the corresponding content in the foregoing method embodiments, and details are not described herein again.

Figure 14:
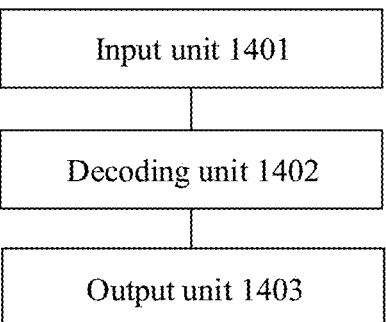
FIG. 14 is a schematic diagram of a framework of another optical module according to an embodiment of this application.

This application provides an optical module. The optical module is configured to implement the decoding method provided in the embodiments of this application. As shown in FIG. 14, the optical module 140 includes: an input unit 1401, configured to receive a signal on which inner-code decoding is to be performed; a decoding unit 1402, configured to: obtain an optical transmission mode used by an optical module for signal transmission, and determine, based on the optical transmission mode, an inner-code decoding scheme for performing inner-code decoding on the signal, where the decoding unit 1402 is further configured to perform inner-code decoding on the signal by using an inner-code decoding scheme; and an output unit 1403, configured to output a signal on which inner-code decoding has been performed, so as to perform outer-code decoding on the signal on which inner-code decoding has been performed.

Optionally, the decoding unit 1402 is specifically configured to: receive indication information from the receiving device, and determine the optical transmission mode based on the indication information.

Optionally, the indication information of the receiving device is obtained through Ethernet auto-negotiation the receiving device and the transmitting device, or the indication information of the receiving device is obtained from a network controller.

Optionally, the decoding unit 1402 is specifically configured to: extract, from the indication information, a parameter used to indicate the optical transmission mode, and determine the optical transmission mode based on the parameter used to indicate the optical transmission mode, where the indication information carries one or more parameters.

Optionally, the optical module includes a memory, and the decoding unit 1402 is specifically configured to determine the optical transmission mode based on a write operation performed by a control device on an identifier that is in the memory and that indicates the optical transmission mode.

Optionally, the decoding unit 1402 includes a selection subassembly and a component code decoder, where the selection subassembly is configured to: select a target candidate signal from a plurality of candidate signals according to the inner-code decoding scheme, and provide the target candidate signal to the component code decoder. The component code decoder is configured to perform inner-code decoding on the signal based on the target candidate signal.

Optionally, the optical transmission mode includes a point-to-point optical transmission mode or a point-to-multipoint optical transmission mode; in the point-to-point optical transmission mode, the signal is transmitted from the transmitting device to the receiving device by using a single channel; and in the point-to-multipoint optical transmission mode, the signal is transmitted from the transmitting device to the receiving device in a single channel-to-multichannel manner.

Optionally, the decoding unit 1402 is specifically configured to query a correspondence between an optical transmission mode and a decoding scheme based on the optical transmission mode, to obtain the inner-code decoding scheme. The correspondence between an optical transmission mode and a decoding scheme includes: the point-to-point optical transmission mode corresponds to a spatially coupled decoding scheme, and the point-to-multipoint optical transmission mode corresponds to a block algebraic decoding scheme.

Optionally, the spatially coupled decoding scheme includes: decoding by using a zipper code; and the block algebraic decoding scheme includes: decoding by using a Hamming code or a BCH code.

In conclusion, in the optical module provided in this embodiment of this application, the optical module can determine, based on the optical transmission mode used by the optical module for signal transmission, the inner-code decoding scheme to be used by the optical module to perform inner-code decoding on the signal, and then perform inner-code decoding on the signal by using the inner-code decoding scheme. In this implementation, the inner-code decoding scheme can be determined based on the optical transmission mode used by the optical module for signal transmission, so that an appropriate decoding scheme can be selected based on different transmission scenarios, and signal transmission performance in different transmission scenarios can be ensured, for example, transmission performance such as error correction performance, a delay requirement, and an energy consumption requirement in a transmission process can be met.

It may be clearly understood by a person skilled in the art that, for the purpose of convenient and brief description, for a detailed operating process of the foregoing optical modules and units, reference may be made to the corresponding content in the foregoing method embodiments, and details are not described herein again.

Figure 15:
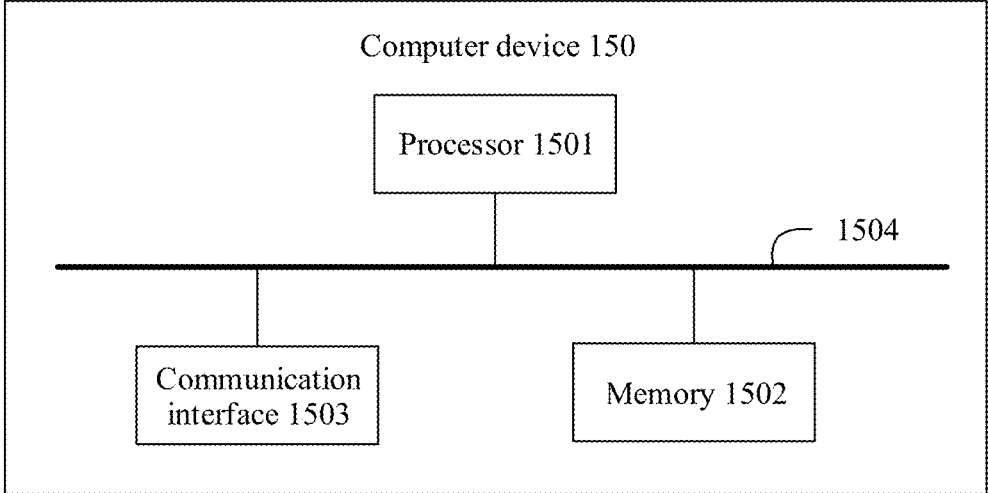
FIG. 15 is a schematic diagram of a structure of a computer device according to an embodiment of this application.

An embodiment of this application further provides a computer device. FIG. 15 is a diagram of an example of a possible architecture of the computer device. As shown in FIG. 15, the computer device 150 may include a processor 1501, a memory 1502, a communication interface 1503, and a bus 1504. The computer device may include one or more processors 1501. FIG. 15 shows only one of the processors 1501. Optionally, the processor 1501 may be a central processing unit (CPU). If the computer device includes a plurality of processors 1501, the plurality of processors 1501 may be of different types or may be of a same type. Optionally, the plurality of processors in the computer device may be further integrated into a multi-core processor.

The memory 1502 stores computer instructions and data, and the memory 1502 may store computer instructions and data required to implement the methods provided in this application. The memory 1502 may be any one or any combination of the following storage media: a non-volatile memory (e.g., a read-only memory (ROM), a solid state disk (SSD), a hard disk (HDD), an optical disc, or a volatile memory.

The communication interface 1503 may be any one or any combination of the following components with a network access function: a network interface (such as an Ethernet interface) and a wireless network interface card.

The communication interface 1503 is configured to perform data communication between the computer device and another node or another computer device.

FIG. 15 also shows a bus 1504 as an example. The bus 1504 may connect the processor 1501 to the memory 1502 and the communication interface 1503. In this way, the processor 1501 may access the memory 1502 through the bus 1504, and may further exchange data with another node or another computer device through the communication interface 1503.

In this application, the computer device executes the computer instructions in the memory 1502, to implement the methods provided in this application. For example, an optical transmission mode used for signal transmission is obtained, a signal on which outer-code encoding has been performed is received, an inner-code encoding scheme for performing inner-code encoding on the signal on which outer-code encoding has been performed is determined based on the optical transmission mode, inner-code encoding is performed, by using the inner-code encoding scheme, on the signal on which outer-code encoding has been performed, and a signal on which inner-code encoding has been performed is output. In addition, for an implementation process of performing, by the computer device by executing the computer instructions in the memory 1502, the steps of the methods provided in this application, refer to corresponding descriptions in the foregoing method embodiments.

An embodiment of this application further provides a computer-readable storage medium. The computer-readable storage medium is a non-volatile computer-readable storage medium. The computer-readable storage medium includes program instructions. When the program instructions are run on a computer device, the computer device is enabled to perform the methods provided in embodiments of this application.

An embodiment of this application further provides a computer program product including instructions. When the computer program product runs on a computer, the computer is enabled to perform the methods provided in embodiments of this application.

In embodiments of this application, the terms "first", "second", and "third" are merely used for description, but cannot be understood as indicating or implying relative importance. The term "at least one" means one or more, and the term "a plurality of" means two or more, unless expressly limited otherwise.

The term "and/or" in this application describes only an association relationship between associated objects, and indicates that three relationships may exist. For example, A and/or B may represent three cases: Only A exists, both A and B exist, and only B exists. In addition, the character "/" in this specification generally indicates an "or" relationship between the associated objects.

The foregoing descriptions are merely optional embodiments of this application, but are not intended to limit this application. Any modification, equivalent replacement, improvement, or the like made within the concept and principle of this application shall fall within the protection scope of this application.

What is claimed is:

1. An encoding method carried out by an optical module comprising at least one processor, the method comprising:
    obtaining an optical transmission mode used for signal transmission;
    receiving a first signal on which outer-code encoding has been performed;
    determining, based on the optical transmission mode, an inner-code encoding scheme to be used by the optical module to perform inner-code encoding on the first signal;
    performing, by using the inner-code encoding scheme, inner-code encoding on the first signal to obtain a second signal; and
    outputting the second signal,
    wherein the optical module comprises:
        a selection subassembly, and
        a component code encoder; and
    wherein the performing the inner-code encoding on the first signal comprises:
        selecting, by the selection subassembly, a target candidate signal from a plurality of candidate signals according to the inner-code encoding scheme,
        providing the target candidate signal to the component code encoder, and
        performing, by the component code encoder based on the target candidate signal, inner-code encoding on the first signal.

2. The method according to claim 1, wherein the obtaining the optical transmission mode used for signal transmission comprises:
    receiving indication information from a transmitting device, and determining the optical transmission mode based on the indication information.

3. The method according to claim 2, wherein the indication information of the transmitting device is obtained through Ethernet auto-negotiation between the transmitting device and a receiving device, or the indication information of the transmitting device is obtained from a network controller.

4. The method according to claim 1, wherein the obtaining the optical transmission mode used for the signal transmission comprises:
    determining the optical transmission mode based on a write operation performed by the control device on an identifier that indicates the optical transmission mode.

5. The method according to claim 1, wherein the optical transmission mode comprises a point-to-point optical transmission mode or a point-to-multipoint optical transmission mode; in the point-to-point optical transmission mode, the second signal is transmitted from a transmitting device to a receiving device by using a single channel; and in the point-to-multipoint optical transmission mode, the second signal is transmitted from the transmitting device to the receiving device in a single channel-to-multichannel manner.

6. The method according to claim 5, wherein the determining, based on the optical transmission mode, the inner-code encoding scheme to be used by the optical module to perform the inner-code encoding on the first signal comprises:

querying a correspondence between the optical transmission mode and an encoding scheme based on the optical transmission mode, to obtain the inner-code encoding scheme, wherein the correspondence comprises: the point-to-point optical transmission mode corresponds to a spatially coupled encoding scheme, and the point-to-multipoint optical transmission mode corresponds to a block algebraic encoding scheme.

7. The method according to claim 6, wherein the spatially coupled encoding scheme comprises: encoding by using a zipper code; and wherein the block algebraic encoding scheme comprises: encoding by using a Hamming code or a BCH code.

8. An inner-code decoding method carried out by an optical module comprising at least one processor, the method comprising:

obtaining an optical transmission mode used for signal transmission;

receiving a first signal on which inner-code decoding is to be performed;

determining based on the optical transmission mode, an inner-code decoding scheme to be used by the optical module to perform the inner-code decoding on the first signal;

performing, by using the inner-code decoding scheme, the inner-code decoding on the first signal to obtain a second signal; and outputting the second signal, so as to perform outer-code decoding on the first signal on which the inner-code decoding has been performed, wherein the optical module comprises:
a selection subassembly, and
a component code decoder; and wherein the performing the inner-code decoding on the first signal by using the inner-code decoding scheme comprises:

selecting, by the selection subassembly, a target candidate signal from a plurality of candidate signals according to the inner-code decoding scheme, providing the target candidate signal to the component code decoder; and performing, by the component code decoder, inner-code decoding on the first signal based on the target candidate signal.

9. The method according to claim 8, wherein the obtaining the optical transmission mode used for signal transmission comprises:

receiving indication information from a receiving device, and determining the optical transmission mode based on the indication information.

10. The method according to claim 9, wherein the indication information of the receiving device is obtained through Ethernet auto-negotiation between the receiving device and a transmitting device, or the indication information of the receiving device is obtained from a network controller.

11. The method according to claim 8, wherein the obtaining the optical transmission mode used for the signal transmission comprises:

determining the optical transmission mode based on a write operation performed by the control device on an identifier that indicates the optical transmission mode.

12. The method according to claim 8, wherein the optical transmission mode comprises a point-to-point optical transmission mode or a point-to-multipoint optical transmission mode; in the point-to-point optical transmission mode, the signal is transmitted from the transmitting device to the receiving device by using a single channel; and in the point-to-multipoint optical transmission mode, the signal is transmitted from the transmitting device to the receiving device in a single channel-to-multichannel manner.

13. An optical module comprising one or more processors configured to cause the optical module to carry out operations of:

receiving a first signal on which outer-code encoding has been performed;

obtaining an optical transmission mode used for signal transmission;

determining, based on the optical transmission mode, an inner-code encoding scheme to be used by the optical module to perform inner-code encoding on the first signal;

performing, by using the inner-code encoding scheme, inner-code encoding on the first signal to obtain a second signal; and outputting the second signal, wherein the optical module comprises:
a selection subassembly, and
a component code encoder; and wherein the performing the inner-code encoding on the first signal comprises:

selecting, by the selection subassembly, a target candidate signal from a plurality of candidate signals according to the inner-code encoding scheme, providing the target candidate signal to the component code encoder, and performing, by the component code encoder based on the target candidate signal, inner-code encoding on the first signal.

14. The optical module according to claim 13, wherein wherein the obtaining the optical transmission mode used for the signal transmission comprises:

receiving indication information from a transmitting device, and determining the optical transmission mode based on the indication information.

15. The optical module according to claim 14, wherein the indication information of the transmitting device is obtained through Ethernet auto-negotiation the transmitting device and a receiving device, or the indication information of the transmitting device is obtained from a network controller.

16. The optical module according to claim 13, wherein the obtaining the optical transmission mode used for the signal transmission comprises:

determining the optical transmission mode based on a write operation performed by the control device on an identifier that indicates the optical transmission mode.

17. An optical module comprising one or more processors configured to cause the optical module to carry out the operations of:

receiving a first signal on which inner-code decoding is to be performed;

obtaining an optical transmission mode used for signal transmission;

determining, based on the optical transmission mode, an inner-code decoding scheme to be used by the optical module to perform inner-code decoding on the first signal;

performing, by using the inner-code decoding scheme, the inner-code decoding on the first signal to obtain a second signal; and outputting the second signal, so as to perform outer-code decoding on the first signal on which the inner-code decoding has been performed, wherein the optical module comprises:

a selection subassembly, and a component code decoder; and wherein the performing the inner-code decoding on the first signal by using the inner-code decoding scheme comprises:

selecting, by the selection subassembly, a target candidate signal from a plurality of candidate signals according to the inner-code decoding scheme, providing the target candidate signal to the component code decoder; and performing, by the component code decoder, inner-code decoding on the first signal based on the target candidate signal.

18. The optical module according to claim 17, wherein the one or more processors is configured to cause the optical module to:

receive indication information from a receiving device, and determine the optical transmission mode based on the indication information.

19. The optical module according to claim 18, wherein the indication information of the receiving device is obtained through Ethernet auto-negotiation between the receiving device and a transmitting device, or the indication information of the receiving device is obtained from a network controller.

20. The optical module according to claim 17, wherein the obtaining the optical transmission mode used for the signal transmission comprises:

determining the optical transmission mode based on a write operation performed by the control device on an identifier that indicates the optical transmission mode.

* * * * *